US010523557B2

(12) United States Patent
Faccin et al.

(10) Patent No.: US 10,523,557 B2
(45) Date of Patent: Dec. 31, 2019

(54) INTERWORKING WITH LEGACY RADIO ACCESS TECHNOLOGIES FOR CONNECTIVITY TO NEXT GENERATION CORE NETWORK

(71) Applicant: QUALCOMM Incorporated, San Diego, CA (US)

(72) Inventors: Stefano Faccin, San Ysidro, CA (US); Haris Zisimopoulos, London (GB); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 15/430,408

(22) Filed: Feb. 10, 2017

(65) Prior Publication Data
US 2017/0289858 A1 Oct. 5, 2017

Related U.S. Application Data

(60) Provisional application No. 62/317,414, filed on Apr. 1, 2016.

(51) Int. Cl.
*H04L 12/707* (2013.01)
*H04W 36/12* (2009.01)
(Continued)

(52) U.S. Cl.
CPC .......... *H04L 45/22* (2013.01); *H04L 12/4633* (2013.01); *H04L 12/6418* (2013.01);
(Continued)

(58) Field of Classification Search
CPC ..... H04L 45/22; H04L 45/24; H04L 12/6418; H04L 12/124633; H04L 61/2007;
(Continued)

(56) References Cited

U.S. PATENT DOCUMENTS

2009/0129342 A1* 5/2009 Hwang ............. H04W 36/0022
370/331
2011/0171953 A1 7/2011 Faccin et al.
(Continued)

FOREIGN PATENT DOCUMENTS

| WO | 2009155005 A1 | 12/2009 | |
| WO | WO-2015160329 A1 | 10/2015 | |
| WO | 2016122589 A1 | 8/2016 | |
| WO | WO 2016122589 A1 * | 8/2016 | ........ H04W 36/0027 |

OTHER PUBLICATIONS

NGMN Alliance: "5G White Paper", Version 1.0, Feb. 17, 2015, pp. 1-125.
(Continued)

*Primary Examiner* — Feben Haile
(74) *Attorney, Agent, or Firm* — Qualcomm IP Dept.; James Hunt Yancey, Jr.

(57) ABSTRACT

Aspects of the disclosure relate to mechanisms for interworking between legacy and next generation radio access technologies (RATs) in a communication network. In some examples, a handover from a next generation access network to a legacy access network may be performed via a next generation core network and a legacy core network. A handover request received at a next generation core network serving node may include an identifier of a target cell within the legacy access network. The next generation core network serving node may identify a legacy core network serving node to which the handover may be forwarded based on the target cell identifier. Packet data units may then be routed over the legacy access network and the next generation core network by mapping data flows in the next generation core network to packet data connections in the legacy access network.

33 Claims, 27 Drawing Sheets

(51) Int. Cl.
| | |
|---|---|
| *H04L 12/64* | (2006.01) |
| *H04W 76/10* | (2018.01) |
| *H04L 29/12* | (2006.01) |
| *H04W 8/22* | (2009.01) |
| *H04W 36/00* | (2009.01) |
| *H04W 36/14* | (2009.01) |
| *H04W 36/30* | (2009.01) |
| *H04L 12/46* | (2006.01) |
| *H04W 76/16* | (2018.01) |
| *H04W 36/28* | (2009.01) |
| *H04W 84/18* | (2009.01) |
| *H04W 88/02* | (2009.01) |

(52) U.S. Cl.
CPC .......... *H04L 45/24* (2013.01); *H04L 61/2007* (2013.01); *H04W 8/22* (2013.01); *H04W 36/0022* (2013.01); *H04W 36/0066* (2013.01); *H04W 36/12* (2013.01); *H04W 36/14* (2013.01); *H04W 36/30* (2013.01); *H04W 76/10* (2018.02); *H04W 76/16* (2018.02); *H04W 36/0016* (2013.01); *H04W 36/28* (2013.01); *H04W 84/18* (2013.01); *H04W 88/02* (2013.01)

(58) Field of Classification Search
CPC . H04W 36/12; H04W 36/14; H04W 36/0022; H04W 36/30; H04W 36/28; H04W 36/0016; H04W 8/22; H04W 76/16; H04W 76/10
See application file for complete search history.

(56) References Cited

U.S. PATENT DOCUMENTS

| | | |
|---|---|---|
| 2011/0310844 A1 | 12/2011 | Rexhepi |
| 2014/0080449 A1 | 3/2014 | Chen et al. |
| 2014/0321426 A1 | 10/2014 | Gruber |
| 2016/0088677 A1 | 3/2016 | Sridharan |
| 2016/0219504 A1 | 7/2016 | Cho et al. |
| 2016/0295549 A1 | 10/2016 | Sebire et al. |
| 2017/0034749 A1 | 2/2017 | Chandramouli et al. |
| 2017/0223565 A1 | 8/2017 | Ericson et al. |
| 2017/0251357 A1 | 8/2017 | Iwai et al. |
| 2017/0288972 A1 | 10/2017 | Li et al. |
| 2017/0289019 A1 | 10/2017 | Faccin et al. |
| 2017/0289858 A1 | 10/2017 | Faccin et al. |
| 2017/0289868 A1 | 10/2017 | Faccin et al. |
| 2017/0289882 A1 | 10/2017 | Faccin et al. |
| 2017/0311245 A1 | 10/2017 | Kuge et al. |
| 2018/0020418 A1 | 1/2018 | Chandramouli et al. |
| 2018/0027610 A1 | 1/2018 | Werner et al. |

OTHER PUBLICATIONS

Notification of Transmittal of the International Preliminary Report on Patentability—PCT/US2017/020752—ISA/EPO—dated Jun. 28, 2018.

Chapter II Demand & Response Under PCT Article 34, PCT/US2017/020752—Filed by Applicant Sep. 14, 2018.
Written Opinion of the International Preliminary Examining Authority—PCT/US2017/020752—ISA/EPO—dated Mar. 2, 2018.
"3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP Standard; 3GPP TS 23.401, 3rd Generation Partnership Project (3GPP), Mobile Competence Centre; 650, Route Des Lucioles; F-06921 Sophia-Antipolis Cedex; France, vol. SA WG2, No. V13.6.1, Mar. 24, 2016 (Mar. 24, 2016), pp. 1-365, XP051088382, [retrieved on Mar. 24, 2016].
Ericsson: "23.502: SGC-EPC Interworking," 3GPP Draft; S2-170805 3rd Generation Partnership Project (3GPP), Mobile Competence Centre ; 650, Route Des Lucioles ; F-06921 Sophia-Antipolis Cedex ; France, vol. SA WG2, No. Dubrovnik Croatia; Feb. 13, 2017-Feb. 17, 2017 Feb. 7, 2017 (Feb. 7, 2017) XP051228096, Retrieved from the Internet: URL:http://www.3gpp.org/ftp/tsg_sa/WG2_Arch/TSGS2_119_Dubrovnik/Docs/—[retrieved on Feb. 7, 2017] Section 4.11 System interworking procedures with EPS.
International Search Report and Written Opinion—PCT/US2017/020748—ISA/EPO—dated May 22, 2017.
International Search Report and Written Opinion—PCT/US2017/020749—ISA/EPO—dated Jun. 13, 2017.
International Search Report and Written Opinion—PCT/US2017/020752—ISA/EPO—dated May 19, 2017.
International Search Report and Written Opinion—PCT/US2017/020758—ISA/EPO—dated Jun. 7, 2017.
NTT Docomo: "Nx-based Interworking Procedures from QoS Point of View", 3GPP Draft; S2-170936_NGX_BASED_IW_PROCEDURES-QOS R7, 3rd Generation Partnership Project (3GPP), Mobile Competence Centre; 650, Route Des Lucioles ; F-06921 Sophia-Antipolis Cedex; France vol. SA WG2, No. Dubrovnik, Croatia; Feb. 13, 2017-Feb. 17, 2017 Feb. 7, 2017 (Feb. 7, 2017), XP051228213, Retrieved from the Internet: http://www.3gpp.org/ftp/tsg_sa/WG2_Arch/TSGS2_119_Dubrovnikl Docs/ [retrieved on Feb. 7, 2017].
NTT Docomo: "TS 23.502: Nx-based Handover Procedure", 3GPP Draft; S2-170937 NX_Based_IW_Procedures_V2.6, 3rd Generation Partnership Project (3GPP), Mobile Competence Centre; 650, Route Des Lucioles; F-06921 Sophia-Antipolis Cedex; France vol. SA WG2, No. Dubrovnik, Croatia; Feb. 13, 2017-Feb. 17, 2017 Feb. 7, 2017 (Feb. 7, 2017), XP051228214, Retrieved from the Internet: http://www.3gpp.org/ftp/tsg_sa/WG2_Arch/TSGS2_119_Dubrovnikl Docs/ [retrieved on Feb. 7, 2017].
Samsung: "Interworking between NextGen Core and EPC", 3GPP Draft, S2-164670 NGC-EPC Interworking, 3rd Generation Partnership Project (3GPP), Mobile Competence Centre, 650, Route Des Lucioles, F-06921, Sophia-Antipolis Cedex, France, vol. SA WG2, No. Sanya, China, Aug. 29, 2016-Sep. 2, 2016, Aug. 23, 2016 (Aug. 23, 2016), XP051139225, Retrieved from the Internet: URL: http://www.3gpp.org/ftp/tsg_sa/WG2_Arch/TSGS2_116BIS_Sanya/Docs/ [retrieved on Aug. 23, 2016].

* cited by examiner

INTERWORKING WITH LEGACY RADIO ACCESS TECHNOLOGIES FOR CONNECTIVITY TO NEXT GENERATION CORE NETWORK

PRIORITY CLAIM

This application claims priority to and the benefit of Provisional Patent Application No. 62/317,414 filed in the U.S. Patent and Trademark Office on Apr. 1, 2016, the entire content of which is incorporated herein by reference as if fully set forth below in its entirety and for all applicable purposes.

TECHNICAL FIELD

The technology discussed below relates generally to wireless communication networks, and more particularly, to interworking with legacy radio access technologies. Embodiments can enable techniques for providing connectivity to next generation core networks.

INTRODUCTION

Wireless access networks are widely deployed to provide various wireless communication services such as telephony, video, data, messaging, broadcasts, and so on. Wireless access networks may be connected to other wireless access networks and to core networks to provide various services, such as Internet access.

For example, current fourth generation (4G) wireless access and core networks, such as the Long Term Evolution (LTE) network, provide Internet Protocol (IP) packet-switching services that may support wireless downlink data rates up to 1 Gbit/second. However, plans are underway to develop new fifth generation (5G) networks that will support even higher data rates and increased traffic capacity, while also supporting different types of devices (i.e., Machine-to-Machine) and providing lower latency.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the disclosure relate to mechanisms for interworking between legacy and next generation radio access technologies (RATs) in a communication network. In some examples, a connectivity request originated by a user equipment towards a legacy core network may be transferred to a next generation core network. This can occur when the user equipment supports the RAT of the next generation core network. In some examples, a connectivity request originated by a user equipment towards a next generation core network may be processed by the next generation core network. In some examples, a handover from a legacy access network to a next generation access network may be performed via a next generation core network and a legacy core network. In some examples, a handover from a next generation access network to a legacy access network may be performed via a next generation core network and a legacy core network.

In one aspect, a method of performing a handover between core networks in a communication network is provided. The method includes receiving, at a first core network serving node within a first core network supporting a first radio access technology (RAT), a handover request for performing a handover of a user equipment from a first wireless access network utilizing the first RAT to a second wireless access network utilizing a second RAT. The handover request includes an identifier of a target cell within the second wireless access network. The method further includes identifying a second core network serving node within a second core network supporting the second RAT based on the identifier of the target cell, and forwarding the handover request to the second core network serving node to complete the handover. The first RAT provides connectivity to one or more data networks via the first core network based on at least one or more Data Network Session (DNS) connections, each including one or more data flows. The second RAT provides connectivity to the one or more data networks via a second core network based on one or more Packet Data Network (PDN) connections.

Another aspect of the disclosure provides a first core network serving node within a first core network. The first core network serving node includes an interface communicatively coupled to a first wireless access network via the first core network, where the first wireless access network utilizes a first radio access technology (RAT). The first core network serving node further includes a memory and a processor communicatively coupled to the interface and the memory. The processor is configured to receive a handover request for performing a handover of a user equipment from the first wireless access network to a second wireless access network utilizing a second RAT, where the handover request includes an identifier of a target cell within the second wireless access network. The processor is further configured to identify a second core network serving node within a second core network supporting the second RAT based on the identifier of the target cell, and forward the handover request to the second core network serving node to complete the handover. The first RAT provides connectivity to one or more data networks via the first core network based on at least one or more Data Network Session (DNS) connections, each including one or more data flows. The second RAT provides connectivity to the one or more data networks via a second core network based on one or more Packet Data Network (PDN) connections.

Another aspect of the disclosure provides a first core network serving node apparatus within a first core network supporting a first radio access technology (RAT). The first core network serving node apparatus includes means for receiving a handover request for performing a handover of a user equipment from a first wireless access network utilizing the first RAT to a second wireless access network utilizing a second RAT, where the handover request including an identifier of a target cell within the second wireless access network. The first core network serving node apparatus further includes means for identifying a second core network serving node apparatus within a second core network supporting the second RAT based on the identifier of the target cell, and means for forwarding the handover request to the second core network serving node apparatus to complete the handover. The first RAT provides connectivity to one or more data networks via the first core network based on at least one or more Data Network Session (DNS) connections, each including one or more data flows. The second RAT provides connectivity to the one or more data networks via a second core network based on one or more Packet Data Network (PDN) connections.

Examples of additional aspects of the disclosure follow. In some aspects of the disclosure, the method may further include converting resource information utilized in the first core network to access information utilized in the second core network, and forwarding the access information to the second core network serving node. For example, the resource information may include at least one of radio bearer configuration information or security information.

In some aspects of the disclosure, the method may further include determining whether Quality of Service (QoS) parameters for the second RAT are available, and if the QoS parameters for the second RAT are available, forwarding the QoS parameters for the second RAT to the second core network serving node.

In some aspects of the disclosure, the method further includes identifying the data flows within one or more active DNS connections of the user equipment to be handed over from the first wireless access network to the second wireless access network, and for each of the data flows, mapping the data flow to a corresponding PDN connection and a corresponding Generic Tunneling Protocol (GTP) tunnel within the corresponding PDN connection for communicating over the second wireless access network. In some examples, the data flow mapping may be based on a data network of the one or more data networks to which the data flow provides connectivity. In some examples, the data flow mapping may further be based on one or more characteristics of the data flow.

In some aspects of the disclosure, the method further includes providing mapping information indicating the mapping between the data flows and the corresponding PDN connections and the corresponding GTP tunnels within the corresponding PDN connections to an interworking serving gateway within the first core network, and providing the mapping information to the user equipment.

In some aspects of the disclosure, each of the data flows is associated with a different Internet Protocol (IP) address of the user equipment utilized in the first core network, and each of the corresponding PDN connections is associated with an additional different IP address of the user equipment utilized in the second wireless access network. In some examples, a first PDN connection includes two or more of the data flows, each mapped to a different corresponding GTP tunnel within the first PDN connection. In some examples, each of the data flows includes an IP flow, an Ethernet flow, or an unstructured data flow.

In some aspects of the disclosure, the method further includes mapping a set of two or more data flows mapped to a first PDN connection to two or more additional GTP tunnels within the first core network, where each of the two or more additional GTP tunnels provides connectivity to a different user plane gateway in the first core network.

Another aspect of the disclosure provides a method for interworking between radio access technologies in a communication network. The method includes receiving mapping information for a user equipment at a core network serving node within a core network supporting a first radio access technology (RAT) after handover of the user equipment from the first RAT to a second RAT. The mapping information indicates a mapping between one or more data flows within one or more Data Network Session (DNS) connections for communicating over the core network and one or more corresponding Generic Tunneling Protocol (GTP) tunnels within one or more corresponding Packet Data Network (PDN) connections for communicating over a wireless access network utilizing the second RAT. The method further includes receiving a packet data unit (PDU) at the core network serving node. If the PDU is an uplink PDU, the method further includes decapsulating the uplink PDU from a GTP tunnel of the one or more GTP tunnels within a PDN connection of the one or more PDN connections to produce a decapsulated PDU, mapping the decapsulated PDU to a data flow of the one or more data flows based on the mapping information to produce a data flow PDU, and routing the data flow PDU to a user plane gateway serving the data flow within the core network.

Another aspect of the disclosure provides an interworking core network serving node for interworking between a first core network supporting a first radio access technology (RAT) and a second core network supporting a second RAT. The interworking core network serving node includes an interface coupled to a wireless access network that utilizes the second RAT, a memory, and a processor communicatively coupled to the interface and the memory. The processor is configured to receive mapping information for a user equipment after handover of the user equipment from the first RAT to the second RAT. The mapping information indicates a mapping between one or more data flows within one or more Data Network Session (DNS) connections for communicating over the first core network and one or more corresponding Generic Tunneling Protocol (GTP) tunnels within one or more corresponding Packet Data Network (PDN) connections for communicating over the wireless access network. The processor is further configured to receive a packet data unit (PDU), and if the PDU is an uplink PDU, decapsulate the uplink PDU from a GTP tunnel of the one or more GTP tunnels within a PDN connection of the one or more PDN connections to produce a decapsulated PDU, map the decapsulated PDU to a data flow of the one or more data flows based on the mapping information to produce a data flow PDU, and route the data flow PDU to a user plane gateway serving the data flow within the first core network.

Another aspect of the disclosure provides an interworking core network serving node apparatus for interworking between a first core network supporting a first radio access technology (RAT) and a second core network supporting a second RAT. The interworking core network serving node apparatus includes means for receiving mapping information for a user equipment after handover of the user equipment from the first RAT to the second RAT. The mapping information indicates a mapping between one or more data flows within one or more Data Network Session (DNS) connections for communicating over the first core network and one or more corresponding Generic Tunneling Protocol (GTP) tunnels within one or more corresponding Packet Data Network (PDN) connections for communicating over a wireless access network utilizing the second RAT. The interworking core network serving node apparatus further includes means for receiving a packet data unit (PDU). If the PDU is an uplink PDU, the interworking core network serving node apparatus further includes means for decapsulating the uplink PDU from a GTP tunnel of the one or more GTP tunnels within a PDN connection of the one or more PDN connections to produce a decapsulated PDU, means for mapping the decapsulated PDU to a data flow of the one or more data flows based on the mapping information to produce a data flow PDU, and means for routing the data flow PDU to a user plane gateway serving the data flow within the first core network.

Examples of additional aspects of the disclosure follow. In some aspects of the disclosure, the method further includes, if the PDU is a downlink PDU of a data flow of the one or more data flows, mapping the downlink PDU to a GTP tunnel of the one or more GTP tunnels and a PDN connection of the one or more PDN connections based on the mapping information, encapsulating the downlink PDU into a PDN PDU, and routing the PDN PDU over the GTP tunnel within the PDN connection to the user equipment via the wireless access network.

In some aspects of the disclosure, each of the data flows is associated with a different Internet Protocol (IP) address of the user equipment utilized in the core network, and each of the corresponding PDN connections is associated with an additional different IP address of the user equipment utilized in the wireless access network. In some examples, a first PDN connection includes two or more of the data flows, each mapped to a different corresponding GTP tunnel within the first PDN connection.

In some aspects of the disclosure, the method further includes receiving additional mapping information indicating an additional mapping between a set of two or more data flows mapped to a first PDN connection to two or more additional GTP tunnels within the core network, where each of the two or more additional GTP tunnels provides connectivity to a different user plane gateway in the core network. In some aspects of the disclosure, the method further includes routing the data flow PDU over an additional GTP tunnel of the one or more additional GTP tunnels based on the additional mapping information.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
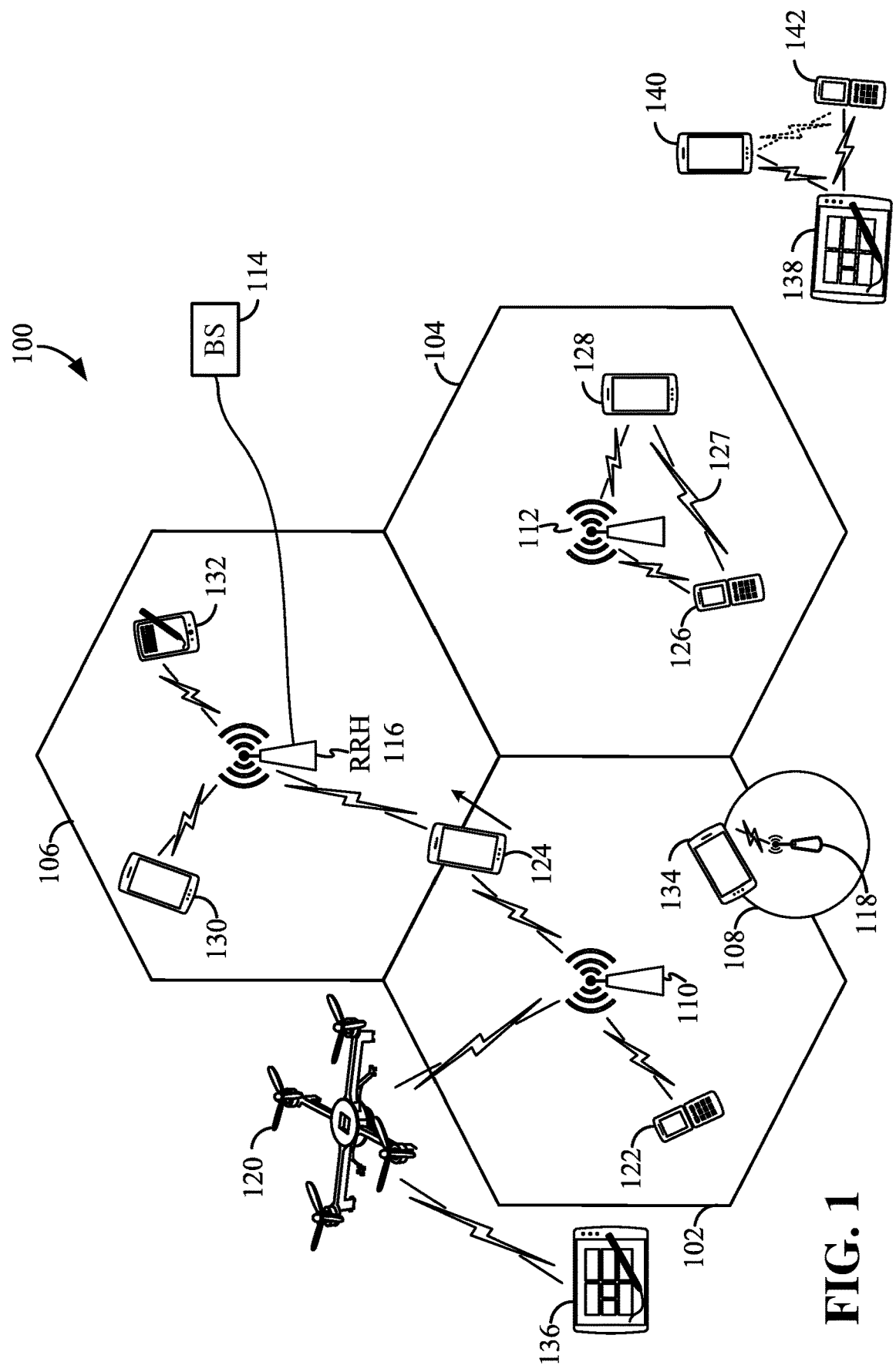
FIG. 1 is a conceptual diagram illustrating an example of a wireless access network.

The various concepts presented throughout this disclosure may be implemented across a broad variety of telecommunication systems, network architectures, and communication standards. Referring now to FIG. 1, as an illustrative example without limitation, a simplified schematic illustration of a wireless access network 100 is provided. The wireless access network 100 may be a legacy access network utilizing a legacy radio access technology (RAT) or a next generation access network utilizing a next generation RAT. The wireless access network 100 may further be coupled to a core network (not shown), which may also be a legacy core network or next generation core network.

As used herein, the term legacy access network, legacy core network, or legacy RAT refers to a network or RAT employing a third generation (3G) wireless communication technology based on a set of standards that complies with the International Mobile Telecommunications-2000 (IMT-2000) specifications or a fourth generation (4G) wireless communication technology based on a set of standards that comply with the International Mobile Telecommunications Advanced (ITU-Advanced) specification. For example, some the standards promulgated by the $3^{rd}$ Generation Partnership Project (3GPP) and the $3^{rd}$ Generation Partnership Project 2 (3GPP2) may comply with IMT-2000 and/or ITU-Advanced. Examples of such legacy standards defined by the $3^{rd}$ Generation Partnership Project (3GPP) include, but are not limited to, Long-Term Evolution (LTE), LTE-Advanced, Evolved Packet System (EPS), and Universal Mobile Telecommunication System (UMTS). Additional examples of various radio access technologies based on one or more of the above-listed 3GPP standards include, but are not limited to, Universal Terrestrial Radio Access (UTRA), Evolved Universal Terrestrial Radio Access (eUTRA), General Packet Radio Service (GPRS) and Enhanced Data Rates for GSM Evolution (EDGE). Examples of such legacy standards defined by the $3^{rd}$ Generation Partnership Project 2 (3GPP2) include, but are not limited to, CDMA2000 and Ultra Mobile Broadband (UMB). Other examples of standards employing 3G/4G wireless communication technology include the IEEE 802.16 (WiMAX) standard and other suitable standards.

As further used herein, the term next generation access network, next generation core network, or next generation RAT generally refers to a network or RAT employing continued evolved wireless communication technologies. This may include, for example, a fifth generation (5G) wireless communication technology based on a set of standards. The standards may comply with the guidelines set forth in the 5G White Paper published by the Next Generation Mobile Networks (NGMN) Alliance on Feb. 17, 2015. For example, standards that may be defined by the 3GPP following LTE-Advanced or by the 3GPP2 following CDMA2000 may comply with the NGMN Alliance 5G White Paper. Standards may also include pre-3GPP efforts specified by Verizon Technical Forum (www.vztgf) and Korea Telecom SIG (www.kt5g.org).

The geographic region covered by the access network 100 may be divided into a number of cellular regions (cells) that can be uniquely identified by a user equipment (UE) based on an identification broadcasted over a geographical from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a GNodeB or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some nonlimiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service user data traffic, and/or relevant QoS for transport of critical service user data traffic.

Within the access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or user data traffic from a base station (e.g., base station 110) to one or more UEs (e.g., UEs 122 and 124) may be referred to as downlink (DL) transmission, while transmissions of control information and/or user data traffic originating at a UE (e.g., UE 122) may be referred to as uplink (UL) transmissions. In addition, the uplink and/or downlink control information and/or user data traffic may be transmitted in slots, which may each include a certain number of symbols of variable duration. For example, the symbol duration may vary based on the cyclic prefix (e.g., normal or extended) and the numerology (e.g., sub-carrier spacing) of the symbol. In some examples, a slot may include one or more mini-slots, which may refer to an encapsulated set of information capable of being independently decoded. One or more slots may be grouped together into a subframe. In addition, multiple subframes may be grouped together to form a single frame or radio frame. Any suitable number of subframes may occupy a frame. In addition, a slot or subframe may have any suitable duration (e.g., 250 µs, 500 µs, 1 ms, etc.).

The air interface in the access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), single-carrier frequency division multiple access (SC-FDMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), single-carrier frequency division multiplexing (SC-FDM) or other suitable multiplexing schemes.

Further, the air interface in the access network 100 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per subframe.

In the radio access network 100, the ability for a UE to communicate while moving, independent of their location, is referred to as mobility. The various physical channels between the UE and the radio access network are generally set up, maintained, and released under the control of a mobility management entity (MME). In various aspects of the disclosure, an access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and subframe timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the access network 100. Each of the cells may measure a strength of the pilot signal, and the access network (e.g., one or more of the base stations 110 and 114/116 and/or a central node within the core network) may determine a serving cell for the UE 124. As the UE 124 moves through the access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
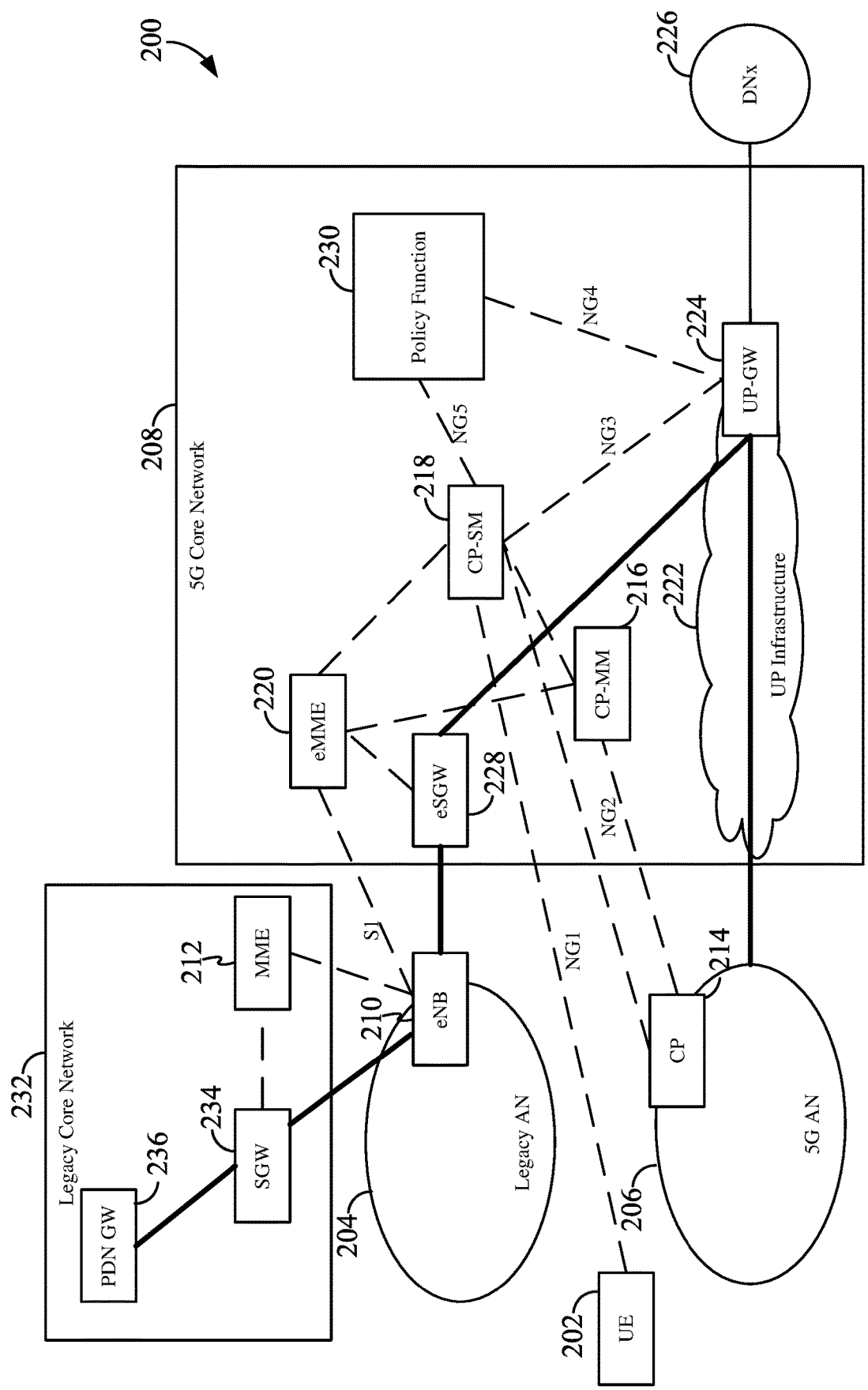
FIG. 2 is a diagram illustrating an example of a network architecture.

FIG. 2 is a block diagram illustrating an example of a network architecture 200 employing both legacy (e.g., 3G and/or 4G) and next generation (e.g., 5G) communication networks. The network architecture 200 may include one or more user equipment (UE) 202, a legacy (3G or 4G) wireless access network (AN) 204, a next generation (5G) wireless AN 206, a legacy (3G or 4G) core network 232 and a next generation (5G) core network 208.

In this illustration, as well as in FIGS. 3-8, any signal path between a UE and a core network is presumed to be passed between these entities by an access network, as represented by an illustrated signal path crossing the access network. Here, the access networks 204 and 206 may each be the access network 100 described above and illustrated in FIG. 1. In the description that follows, when reference is made to an access network (AN) or actions performed by the AN, it may be understood that such reference refers to one or more network nodes in the AN that is or are communicatively coupled to a core network e.g., via a backhaul connection. As one nonlimiting example, for clarity of description, such reference to the AN may be understood as referring to a base station. However, those of ordinary skill in the art will comprehend that this is may not always be the case, for example, as in certain 3G RANs where base stations are under the control or direction of centralized radio network controllers within their AN. In addition, both user plane (UP) and control plane (CP) functionality may be supported by the UE 202, the access networks 204 and 206 and the core networks 208 and 232. In FIGS. 2-8, CP signaling is indicated by dashed lines, and UP signaling is indicated by solid lines.

In some examples, the legacy AN 204 may provide an access point to both the legacy core network 232 and the next generation core network 208, while the next generation AN 206 may provide an access point to the next generation core network 208. In other examples, the legacy AN 204 and the next generation AN 206 may each provide respective access points to both the legacy core network 232 and the next generation core network 208.

In various aspects of the present disclosure, each access network (legacy AN 204 and next generation AN 206) may utilize a different respective radio access technology (RAT) to access a core network (e.g., next generation core network 208 and/or legacy core network 232). For example, the legacy AN 204 may utilize a first (e.g., legacy) RAT to access a core network (e.g., either the next generation core network 208 or the legacy core network 232), while the next generation AN 206 may utilize a second (e.g., next generation) RAT to access a core network.

The legacy wireless AN 204 may be, for example, an Evolved UMTS Terrestrial Radio Access Network (E-UTRAN) within a Long Term Evolution (LTE) network, a Universal Mobile Telecommunications System (UMTS) Terrestrial Radio Access Network (UTRAN), a Wireless Local Area Network (WLAN) or other type of legacy access network. The next generation wireless AN 206 may be, for example, a 5G Radio Access Network (RAN) or Evolved E-UTRAN (i.e., an E-UTRAN enhanced to natively connect to the next generation core network 208 with the same interface as the 5G RAN). In other examples, the next generation AN 206 may be a next generation Wireless Local Area Network (WLAN), a next generation fixed broadband Internet access network or other type of next generation access network that utilizes a next generation RAT to access the next generation core network 208.

The legacy wireless AN 204 may include an evolved Node BS (eNB) 210 and other eNB's (not shown). The eNB 210 provides user and control plane protocol terminations toward the UE 202. The eNB 210 may also be referred to by those skilled in the art as a base station, a base transceiver station, a radio base station, a radio transceiver, a transceiver function, a basic service set (BSS), an extended service set (ESS), or some other suitable terminology. The eNB 210 may be connected to the other eNBs via an X2 interface (i.e., backhaul).

The eNB 210 provides an access point to the legacy core network 232, such as an Evolved Packet Core (EPC) network. In addition, although not shown, the next generation AN 206 may also provide an access point to the legacy core network 232. The legacy core network 232 may include, for example, a Serving Gateway (SGW) 234, a Packet Data Network (PDN) Gateway 236 and a Mobility Management Entity (MME) 212. All user IP packets are transferred through the SGW 234, which itself is connected to the PDN Gateway 236. The PDN Gateway 236 provides UE IP address allocation as well as other functions.

The MME 212 is the control node that processes the signaling between the UE 202 and the legacy core network 232. Generally, the MME 212 provides bearer and connection management for UEs 202 according to mechanisms defined for the legacy core network 232. For example, the MME 212 may manage security when a UE 202 connects to the legacy AN 206 by using information provided by a Home Subscriber Server (HSS, not shown) to authenticate UEs and update UEs location information in the HSS. The MME 212 may further maintain the tracking area identity (TAI) of the current tracking area (e.g., group of neighboring cells/eNBs) within which the UE 202 is located to enable paging of the UE 202 when the UE is in idle mode. In some examples, the legacy access network 204 may include a single tracking area. In other examples, the legacy access network 204 may include two or more tracking areas. Moreover, the MME 212 may manage connectivity via Packet Data Connections (PDNs) between the UE 202 and the PDN Gateway 236, and determine and provide a set of legacy Quality of Service (QoS) parameters to the eNB 210.

In various aspects of the disclosure, the eNB 210 may further provide an access point to the next generation core network 208. In addition, the next generation wireless AN 206 may also provide an access point to the next generation core network 208. The next generation core network 208 may include, for example, a control plane mobility management function (CP-MM) 216, a control plane session management function (CP-SM) 218, an evolved MME (eMME) 220, a user plane infrastructure 22, a user plane gateway (UP-GW) 224, an evolved serving gateway (eSGW) 228 and a policy function 230. In some examples, the eMME 220 may be located outside of the next generation core network 208 (e.g., the eMME may be located within the legacy core network 232 or may be a stand-alone node). The eMME 220 and eSGW 228 may be referred to herein as interworking core network serving nodes, each configured to interwork between the legacy core network 232 and the next generation core network 208.

The CP-MM 216 provides mobility management and authentication of UEs 102, while the CP-SM 218 processes signaling related to data network sessions involving UEs 202. For example, the CP-SM 218 may process data session signaling from UEs 202 via a logical Next Generation-1 (NG-1) interface. The CP-MM 216 and CP-SM 218 may further be communicatively coupled to the eMME 220 for interworking with the legacy core network 232 and legacy AN 204 during deployment of next generation networks. For example, the eMME 220 may connect to the eNB 210 of the legacy AN 204 via, for example, a logical S1 interface, to enable interworking of the control plane with the legacy MME 212 via the eNB 210. The eNB 210 within the legacy AN 206 may further be connected to the eSGW 228 within the next generation core network 208. The eSGW 228 provides interworking of the user plane between the legacy AN 204 and the next generation core network 208.

The next generation wireless AN 206 may include a control plane node 214 for processing and handling control signaling within the next generation AN 206. The control plane node 214 is communicatively coupled to the CP-MM 216 and CP-SM 218 within the next generation core network 208 via respective logical Next Generation-2 (NG-2) interfaces. The CP 214 may further be communicatively coupled to the MME 212 within the legacy core network 232 to provide signaling between the next generation AN 206 and the legacy core network 232.

The UP infrastructure 222 facilitates routing of packet data units (PDUs) to and from UEs 202 via the next generation AN 206. PDU's may include, for example, IP packets, Ethernet frames and other unstructured data (i.e., Machine-Type Communication (MTC)).

The UP-GW 224 is connected to the UP infrastructure 222 to provide connectivity to external data networks 226. In addition, the UP-GW 224 may communicatively couple to the CP-SM 218 via, for example, a logical NG-3 interface, to configure the UP connection over the next generation core network 208. The UP-GW 224 may further connect to the eSGW 228 within the next generation core network 208 to provide connectivity between the legacy AN 204 and the external data networks 226.

The UP-GW 224 further provides UE data connection address (e.g., IP address, Ethernet address and/or unstructured data identification) allocation and policy control. For example, the UP-GW 224 may be communicatively coupled to a Policy Function 230 via, for example, a logical NG-4 interface, to determine network policies. The Policy Function 230 may further communicatively couple to the CP-SM 218 via, for example, a logical NG-5 interface, to provide policy information to the CP-SM 218.

To establish a connection to the next generation (5G) core network 208 via the next generation AN 206, the UE 202 may receive System Information Blocks (SIBs) from the next generation AN 206 including information regarding the capabilities of the AN 206, and upon determining that the AN 206 is a next generation AN, transmit a connectivity request (including an attach request) to the next generation core network 208 via the next generation AN 206. The connectivity request may include a set of capabilities of the UE 202 to the next generation core network (e.g., the CP-MM 216 and/or the CP-SM 218). The set of capabilities may include, for example, an indication that the UE supports connectivity to legacy networks (e.g., legacy AN 204). The set of capabilities may further include an indication of whether the UE supports inter-RAT handovers (e.g., a handover between the next generation RAT and the legacy RAT in the access networks) initiated by the UE 202.

The CP-MM 216 and/or CP-SM 218 may process the connectivity request based on the set of capabilities, a UE profile, network policies and other factors. In various aspects of the disclosure, the CP-MM 216 and/or CP-SM 218 may establish a data network session (DNS) connection between the UE 202 and an external data network 226 over the next generation AN 206 via the UP infrastructure 222. A DNS may include one or more sessions (e.g., data sessions or data flows) and may be served by multiple UP-GWs 224 (only one of which is shown for convenience). Examples of data flows include, but are not limited to, IP flows, Ethernet flows and unstructured data flows. Upon successfully establishing connectivity to the UE 202, the CP-MM 216 and/or CP-SM 218 may further provide an indication of whether the next generation core network 208 supports inter-RAT handovers initiated by the UE 202 and/or may indicate whether the UE 202 is allowed to perform inter-RAT handovers.

The CP-MM 216 and/or CP-SM 218 may further use one or more of the set of capabilities, a UE profile, network policies, and other factors to select a Quality of Service (QoS) to be associated with the connectivity to the UE 202. For example, if the set of capabilities indicates that the UE 202 supports connectivity to legacy networks 204, and includes some of the QoS parameters used in legacy networks (e.g., Guaranteed Bit Rate (GBR) and/or specific QoS Class Identifiers (CQIs)), the QoS may include one or more QoS parameters associated with the next generation core network 208 and one or more QoS parameters associated with the legacy AN 204 to enable interworking with the legacy network 204 in case of handover from the next generation AN 206 to the legacy AN 204. Thus, the CP-MM 216 and/or CP-SM 218 may establish values for 5G QoS parameters and values for legacy QoS parameters. These parameters may be stored in the CP-MM and/or the CP-SM upon connectivity establishment to the next generation core network 208 and provided to the eMME 220 upon handover to the legacy AN 204.

However, if the next generation AN 206 is a non-3GPP AN (e.g., a WLAN Access Point, WiFi Access Point, etc.), the non-3GPP AN may provide in non-access stratum (NAS) messages (e.g., higher level signaling messages) a set of information on the core network capabilities, including an indication of whether the core network is a next generation core network 208. Based on the indication that the core network is a next generation core network 208, the UE 202 may provide the set of capabilities of the UE, described above. In other examples, the UE may query the non-3GPP AN for the Access Point (AP) capabilities (including supported core network capabilities) prior to connectivity, using, for example, a HotSpot 2.0 policy query response mechanism. The non-3GPP AN may respond to the query with the core network capabilities, including an indication of whether the core network is a next generation network. For example, a HotSpot 2.0 management object may be enhanced to include an indication of whether the core network is a next generation network.

To establish a connection to the next generation (5G) core network 208 via the legacy (3G or 4G) AN 204, the UE may provide a connectivity request message to the MME 212 selected by the legacy AN 204. In some examples, the connectivity request message may be a NAS message including a UEAccessCapabilities Information Element that provides the set of capabilities of the UE 202. For example, the set of capabilities may include an indication that the UE supports connectivity to next generation networks (e.g., next generation CN 208) and an indication of whether the UE supports inter-RAT handovers (e.g., a handover between the legacy RAT and the next generation RAT) initiated by the UE 202. In some examples, the NAS message may be encapsulated in an Access Stratum (AS) message, and both the NAS message and the AS message may include an indication of whether the UE supports connectivity to next generation networks.

Based on the set of capabilities, the MME 212 may transfer the connectivity request to an eMME 220. For example, if the set of capabilities indicates that the UE supports connectivity to next generation networks, the MME 212 may transfer the connectivity request to the eMME 220 serving the current tracking area of the UE 202 that is associated with the legacy AN 204. In some examples, the MME 212 may be configured with a list of eMMEs serving the current tracking area of the UE 202 associated with the legacy AN 204 and may select one of the eMMEs from the list for redirection of the connectivity request. The list of eMMEs may be included, for example, in one or more configuration tables in the MME 212. The configuration tables may be configured, for example, by the network operator. In some examples, the MME 212 may forward the connectivity request to the eMME 220. In other examples, the MME 212 may redirect the connectivity request from the eNB 210 to the eMME 220 via the eSGW 228 (e.g., the MME 212 may instruct the eNB 210 to send the connectivity request to the eMME 220).

The eMME 220 may process the connectivity request based on the set of capabilities, a UE profile, network policies and other factors. The eMME 220 may further use one or more of the set of capabilities, a UE profile, network policies, and other factors to select a Quality of Service (QoS) to be associated with the connectivity to the UE 202. In some examples, the eMME 220 may establish values for 5G QoS parameters and values for legacy QoS parameters. Upon successfully establishing connectivity to the UE 202, the eMME 220 may further provide an indication of whether the next generation core network 208 supports inter-RAT handovers initiated by the UE 202 via the eSGW 228.

In one example, when the UE 202 attaches to the legacy AN 204, the eMME 220 acts as a CP-MM 216 to anchor the MM context. In this example, the UE 202 establishes an enhanced mobile management (EMM) context with the eMME 220 and authenticates with the eMME 220 using legacy mechanisms. The eMME 220 may interact with an Authentication, Authorization and Accounting (AAA) server/HSS (not shown) to retrieve the subscriber profile for the UE and perform authentication and key derivation to secure the radio link. Upon handover to a next generation AN 208, the eMME 220 may then interact with a CP-MM 216 (selected during the handover procedure based on the identity of the target cell or next generation AN), and the MM context may be transferred from the eMME 220 to the target CP-MM 216.

In another example, when the UE 202 attaches to the legacy AN 204, a CP-MM 216 may be used to anchor the MM context. In this example, the UE establishes an EMM context with the eMME 220. The eMME 220 may then select a serving CP-MM 216 based on preconfigured information (e.g., based on the location of the serving legacy cell), and trigger an MM context establishment towards the CP-MM 216. The CP-MM 216 may perform UE authentication with message exchanges between the UE 202 and CP-MM 216 routed via the eMME 220. Thus, the CP-MM 216 may interact with the AAA/HSS to retrieve the subscriber profile and perform the authentication and key derivation to secure the radio link.

In some examples, the CP-MM 216 may further receive a set of keys from the AAA/HSS for the next generation core network, derive a set of keys specific to the legacy AN, and distribute the legacy keys to the eMME 220 to secure the radio link. In other examples, the CP-MM 216 may distribute the next generation keys received from interaction with the AAA/HSS to the eMME 220, and the eMME 220 may then map the next generation keys to legacy keys (e.g., keys suitable for the legacy AN). As a result, two MM contexts are created and maintained: one in the eMME 220 and one in the CP-MM 216. However, for UE mobility within the legacy AN 204, the eMME 220 may not interact with the CP-MM 216 unless a change of eMME (e.g., from a source eMME to a target eMME) is triggered by the UE mobility, in which case the eMME (either source or target) may inform the CP-MM 216 of the change in eMME. Upon handover to a next generation AN 206, the serving CP-MM 216 may continue to serve the UE attached to the next generation AN 206, or a CP-MM relocation to a target CP-MM may occur based on the location of the UE, in which case the MM context is moved to the target CP-MM.

Figure 3:
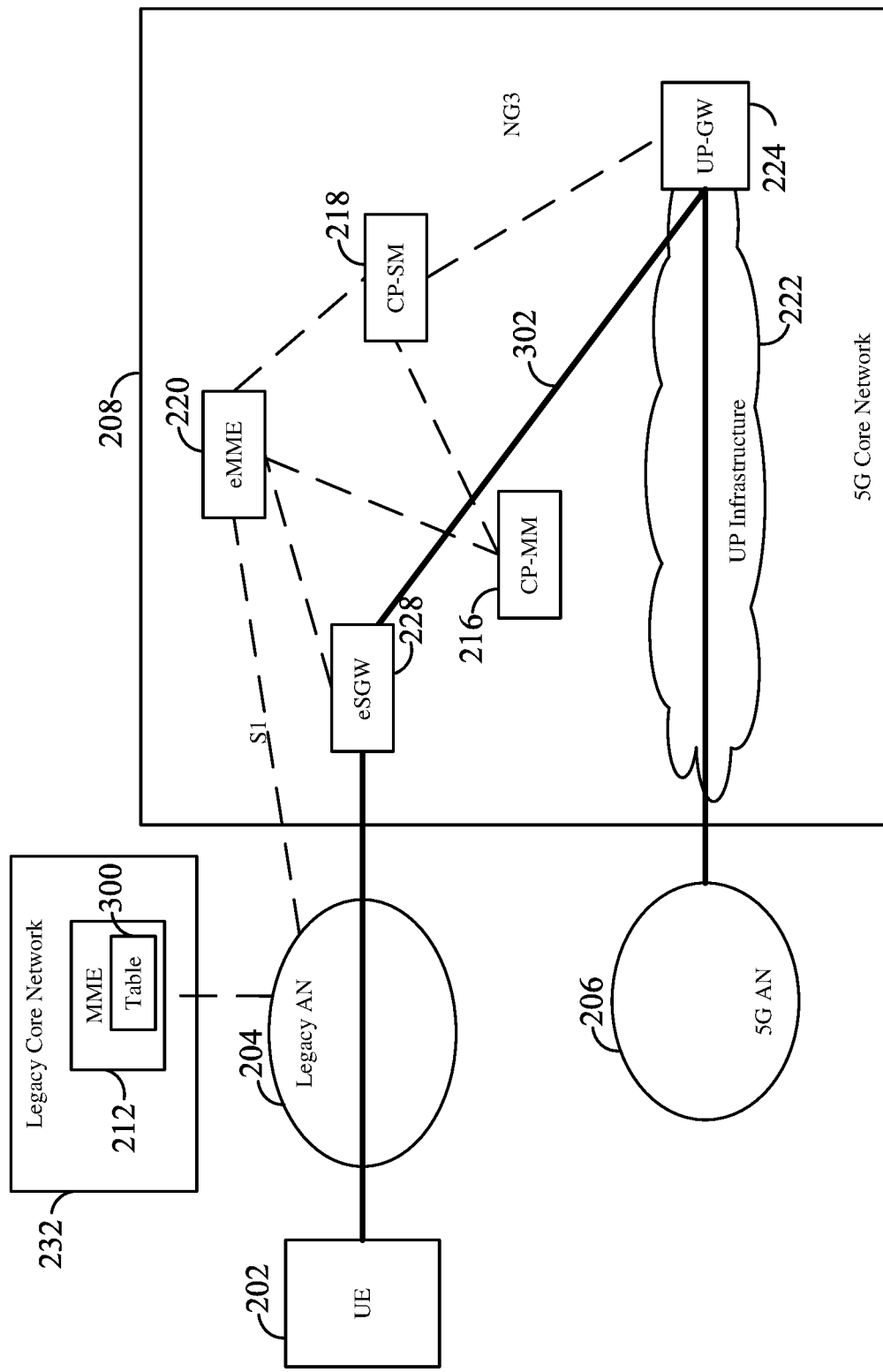
FIG. 3 is a diagram illustrating exemplary connectivity to a next generation core network over a legacy wireless access network.

FIG. 3 is a block diagram illustrating an initial connectivity of a UE 202 to a next generation core network 208 over a legacy AN 204. In the example shown in FIG. 3, the UE 202 may first establish connectivity to a legacy core network 232 through the legacy wireless AN 204 utilizing a legacy RAT. The MME 212 in the legacy core network 232 receives the connectivity request, which may be, for example, a non-access stratum (NAS) message, including a set of capabilities of the UE. The set of capabilities may include, for example, an indication of whether the UE supports legacy and/or next generation RATs and an indication of whether the UE supports an inter-RAT handover (i.e., between legacy and next generation ANs) initiated by the UE.

Based on the set of capabilities and/or a user profile/subscription, the MME 212 may determine that the UE supports a next generation RAT and select an interworking core network serving node (e.g., eMME 220) to establish and relocate connectivity of the UE 202 to the next generation core network 208. For example, the MME 212 may access a configuration table 300 configured by the operator that maintains a list of eMMEs and select the eMME 220 that serves a current tracking area of the UE 202 associated with the legacy wireless AN 204. The MME 212 may further transfer the NAS message to the selected eMME 220 (e.g., the MME 212 may either forward the NAS message to the eMME 220 or redirect the NAS message to the eMME 220 via the legacy AN 204 and the eSGW 228).

Since the legacy AN 204 may not support DNS connections, to establish data connectivity to the next generation core network 208 and provide interworking via the legacy AN 204, aspects of the disclosure enable the eMME 220 to establish a packet data network (PDN) connection 302 over the legacy AN 204 between the UE 202 and a UP-GW 224 via the next generation core network 208. During the PDN connection establishment, the eMME 220 may act as a CP-SM or the CP-SM 218 may be involved to anchor the SM context. If the eMME 220 acts as a CP-SM, the UE 202 may establish an enhanced session management (ESM) context with the eMME using legacy mechanisms. In this example, the SM context may only be created in the eMME 220. The eMME 220 may then perform SM functionality based on the connectivity parameters provided by the UE 202. Such SM functionality may include, for example, UP-GW 224 selection, tunnel establishment between the UP-GW 224 and eSGW 228, etc.

If the CP-SM 218 is involved to anchor the SM context, upon receiving the PDN connectivity request from the UE 202, the eMME 220 may select a CP-SM 218 based on preconfigured information (e.g., the location of the serving legacy cell) and forward the connectivity request to the CP-SM 218, including all of the parameters provided by the UE 202. The SM functionality may then be performed by the CP-SM. In either of the above scenarios, a single UP-GW 224 may be selected to serve the PDN connection 302, and a single data connection address (e.g., IPv4 and/or IPv6, or other type of address, such as Ethernet or unstructured data identification) may be provided to the UE 202 for the PDN connection 302.

If multiple data connection addresses are required for connectivity to a particular external data network, in one example, the UE 202 may request additional data connection addresses upon handover to a next generation AN 206. In another example, when a PDN connection is established over the legacy AN 204, the next generation core network may return to the UE 202 an indication of whether multiple data connection addresses can be supported over the PDN connection, and provide a set of information to be used by the UE 202 to request additional data connection addresses. The set of information may include, for example, an address corresponding to the serving UP-GW 224 that enables the UE to request additional data connection addresses from the UP-GW 224. The UE 202 may then request additional data connection addresses using a protocol, such as Dynamic Host Configuration Protocol (DHCP), where the UP-GW 224 acts as a DHCP server and selects an additional data connection address. The UP-GW 224 may further interact with the eMME 220 or the CP-SM 218 to authorize the request.

In another example, if multiple data connection addresses are required, when a PDN connection is established over the legacy AN 204, the next generation core network may return to the UE 202 an indication of whether multiple data connection addresses can be supported over the next generation core network. The UE 202 may then use enhanced NAS signaling to the eMME 220 to request additional data connection addresses and provide the connectivity requirements for the new data connection addresses (e.g., the type of session continuity required). Upon receiving the request, the eMME 220 may either evaluate the request or forward the request to the serving CP-SM 218. The eMME 220 or the CP-SM 218 may then verify that the UE is authorized to request a new data connection address and process the information provided by the UE. The eMME 220/CP-SM 218 may then select a UP-GW 224, which assigns the new data connection address, and establishes the connectivity to the UP-GW 224, including, for example, tunnel establishment between the new UP-GW 224 and the eSGW 228. The eMME 220/CP-SM 218 may then return the new data connection address to the UE 202.

In some examples, different credentials may be desired for different PDN connections. To enable enhanced session management (ESM) based on different credentials than the one used to establish an enhanced mobility management (EMM) context with the eMME 220, NAS ESM signaling may be further enhanced to enable the PDN connection procedure to allow an authorization separate from the authorization used for the EMM establishment based on a set of credentials provided by the UE 202. In this example, a NAS signaling exchange may be introduced to encapsulate an authentication protocol exchange (e.g., EAP) between the UE 202 and the entity performing the authentication (e.g., the eMME 220 or the CP-SM 218, depending on where the SM context is anchored).

If the eMME 220 performs the authentication, the eMME 220 may interact with the AAA/HSS (identified based on the credentials provided by the UE) to retrieve the subscriber profile and perform the authentications and key derivation to secure over the radio link one or more of the signaling and PDUs corresponding to the ESM context being authenticated. Upon handover to a next generation AN 206, the eMME 220 may interact with the CP-SM 218 (selected during the handover procedure based on, e.g., one or more of the identity of the target AN, location of the target AN, service and/or connectivity requirements provided by the UE or derived from the UE profile during connectivity establishment, etc.), and the SM context may be transferred from the eMME 220 to the CP-SM 218.

If the CP-SM 218 performs the authentication, the CP-SM 218 may interact with the AAA/HSS (identified based on the credentials provided by the UE) to retrieve the subscriber profile and perform the authentications and key derivation to secure over the radio link one or more of the signaling and PDUs corresponding to the ESM context being authenticated. For example, the CP-SM 218 may derive a set of keys specific to legacy networks and distribute the legacy keys to the eMME 220 or the CP-SM 218 may distribute the derived keys to the eMME 220 and the eMME 220 may then map the derived keys to legacy keys. In this example, two SM contexts may be created and maintained: one in the eMME 220 and one in the CP-SM 218. Upon handover to a next generation AN 206, the CP-SM 218 may distribute the existing keys for the ESM context to the target AN or may derive new keys. In addition, the serving CP-SM 218 may continue to serve the UE attached to the new next generation AN 206, or a CP-SM relocation may occur. If a CP-SM relocation occurs, the SM context may be transferred to the new/target CP-SM.

When a UE 202 establishes a PDN over a legacy AN 204, if the UE 202 provides an Access Point Name (APN) or an APN is selected by the eMME 220, and the UE is not enabled to provide connectivity requirements or the UE does not provide them, in one example, the eMME 220 may interact with the AAA/HSS and/or a CP-SM 218 (selected by the eMME 220 based on preconfigured information) to derive the connectivity requirements corresponding to the APN that would apply for equivalent connectivity over a next generation AN 206. In another example, the eMME 220 may be preconfigured to map a specific APN to specific connectivity requirements. If the eMME 220 is acting as a CP-SM, the eMME 220 may use the connectivity requirements for connectivity establishment (e.g., QoS establishment, UP-GW selection, etc.). If the CP-SM 218 is involved to anchor the SM context, the eMME may forward the connectivity requirements to the CP-SM 218 for connectivity establishment.

Figure 4:
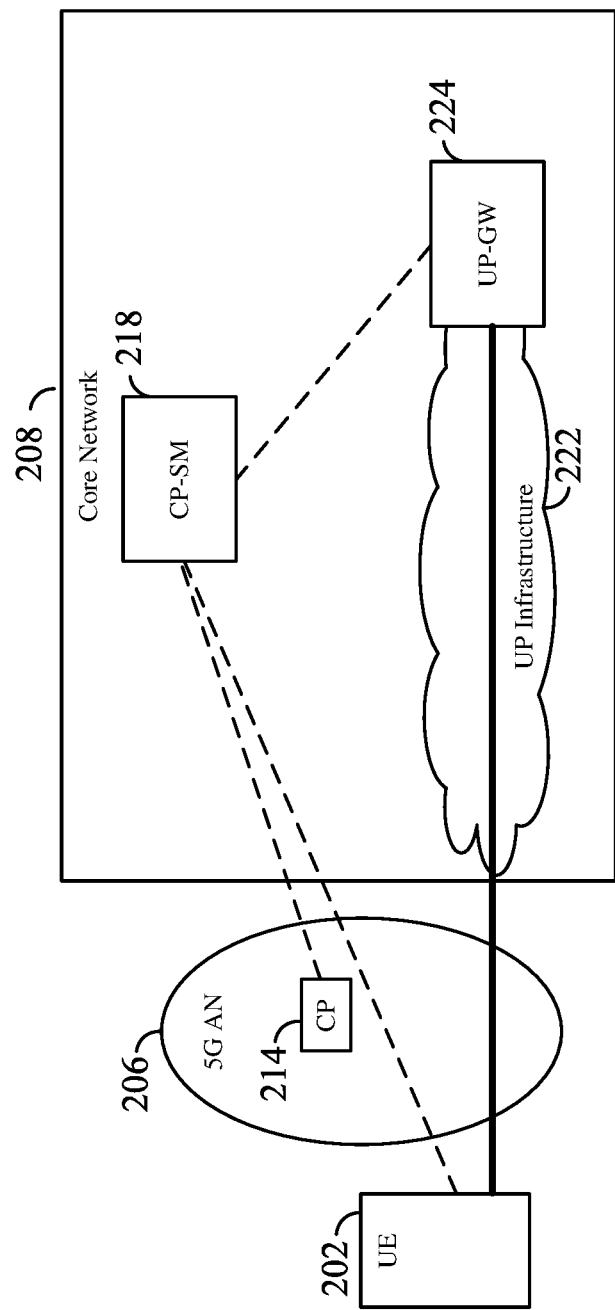
FIG. 4 is a diagram illustrating connectivity to a next generation core network over a next generation wireless access network.

FIG. 4 is a block diagram illustrating an initial connectivity of a UE 202 to a next generation core network 208 over a next generation (e.g., 5G) AN 206. In the example shown in FIG. 4, the UE 202 may attempt to establish connectivity to a next generation core network 208 through a next generation AN 206. For example, the UE 202 may transmit a connectivity request including a set of capabilities of the UE 202 to the next generation core network 208 via the next generation AN 206 and the CP 214. The set of capabilities may include, for example, an indication of whether the UE supports legacy and/or next generation RATs and an indication of whether the UE supports an inter-RAT handover (i.e., between legacy and next generation ANs) initiated by the UE.

The connectivity request may be received, for example, by a CP-SM 218 and/or CP-MM 216 within the next generation core network 208. Upon determining that the UE 202 supports the next generation RAT, the CP-SM 218 and/or CP-MM 216 processes the connectivity request to establish data connectivity between the UE 202 and the next generation core network 208. For example, the CP-SM 218 and/or CP-MM may establish a data network session (DNS) connection between the UE 202 and an external data network over the next generation AN 206 via the UP infrastructure 222. A DNS may include one or more sessions (e.g., data sessions or data flows) and may be served by multiple UP-GWs 224 (only one of which is shown for convenience). Examples of data flows include, but are not limited to, IP flows, Ethernet flows and unstructured data flows.

During the DNS connection establishment, for example, the CP-SM 218 may establish an enhanced session management (ESM) context for the UE 202. The CP-SM 218 may then perform SM functionality based on the connectivity parameters provided by the UE 202. Such SM functionality may include, for example, connection establishment via the UP infrastructure 222. For example, to establish the DNS, a set of context information may be provided in various entities within the UP infrastructure 222 of the next generation core network 208 to provide connectivity between the UE 202 and an external data network (e.g., IMS, Internet or other dedicated data networks). In various aspects of the present disclosure, the UP-GW 224 may further support multiple data network sessions between a single UE 202 and one or more external data networks 226.

Figure 5:
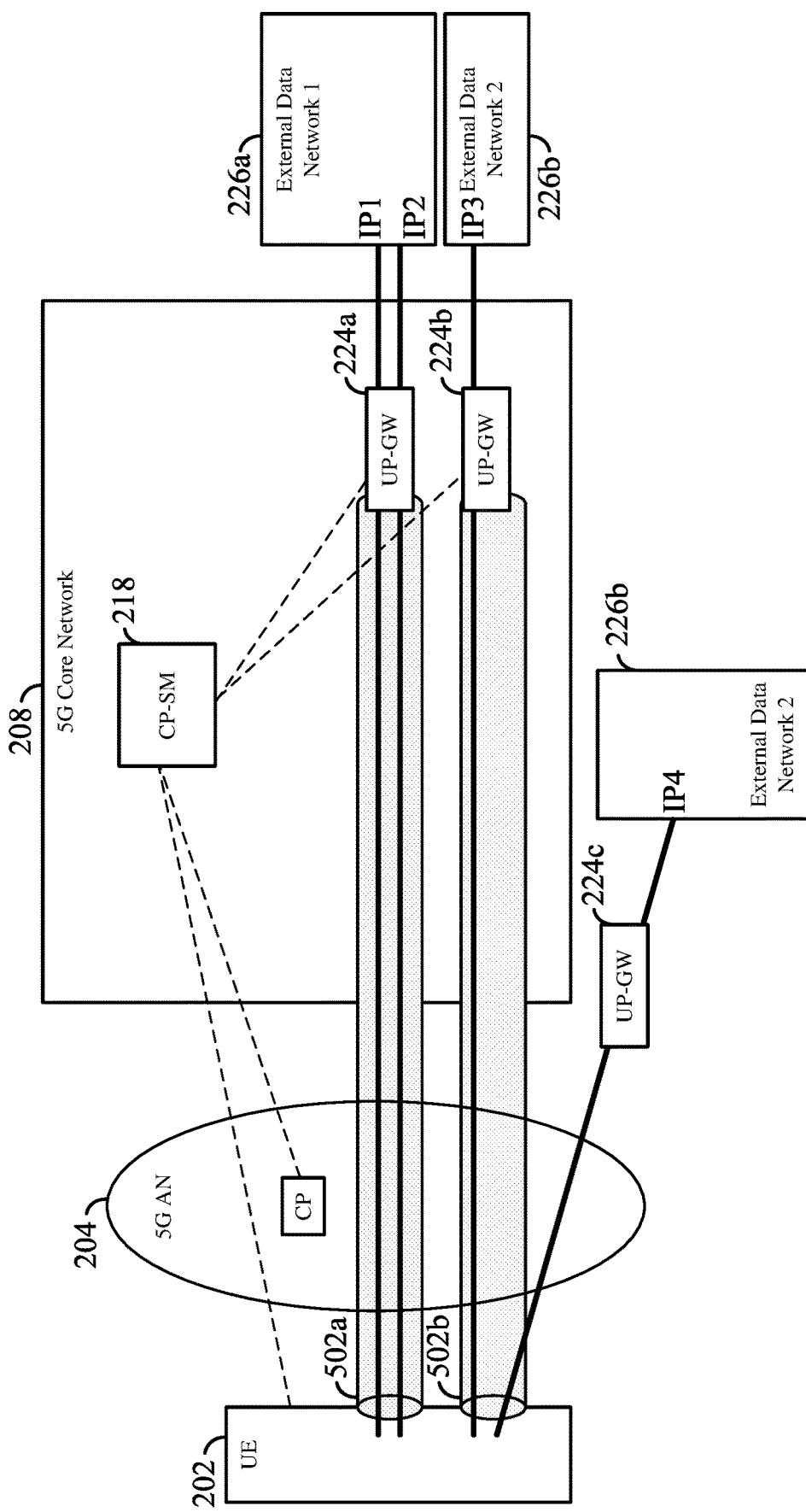
FIG. 5 is a diagram illustrating exemplary data network sessions established over a next generation communication network.

FIG. 5 is a block diagram illustrating one example of communication utilizing multiple data network sessions between a UE 202 and one or more external data networks 226. In the example shown in FIG. 5, the UE 202 is actively engaged in two data network sessions (DN Session 1, 226*a* and DN Session 2, 226*b*). Each data network session (DNS) is a logical context in the UE 202 that enables communication between a local endpoint in the UE (e.g., a web browser) and a remote endpoint (e.g. a web server in a remote host) and each DNS connection may include one or more data sessions (e.g., IP, Ethernet and/or unstructured data sessions). In the example shown in FIG. 5, DN Session 1 is served by UP-GW 224*a* and includes two IP sessions (IP1 and IP2), each associated with a different IP address of the UE 202. DN Session 2 also includes two IP sessions (IP3 and IP4), each associated with a different IP address of the UE 202. However, IP3 is served by UP-GW 224*b*, while IP4 is served by a local UP-GW 224*c*. The session management context (e.g., leveraging software defined networking (SDN) and signaling routing) for DN Session 1 and DN session 2 is provided in the CP-SM 218. The user plane context (e.g., Quality of Service (QoS), tunneling, etc.) for DN Session 1 is provided in the UP-GW 224*a*, while the user plane context for DN Session 2 is provided in both UP-GW 224*b* and local UP-GW 224*c*.

Figure 6:
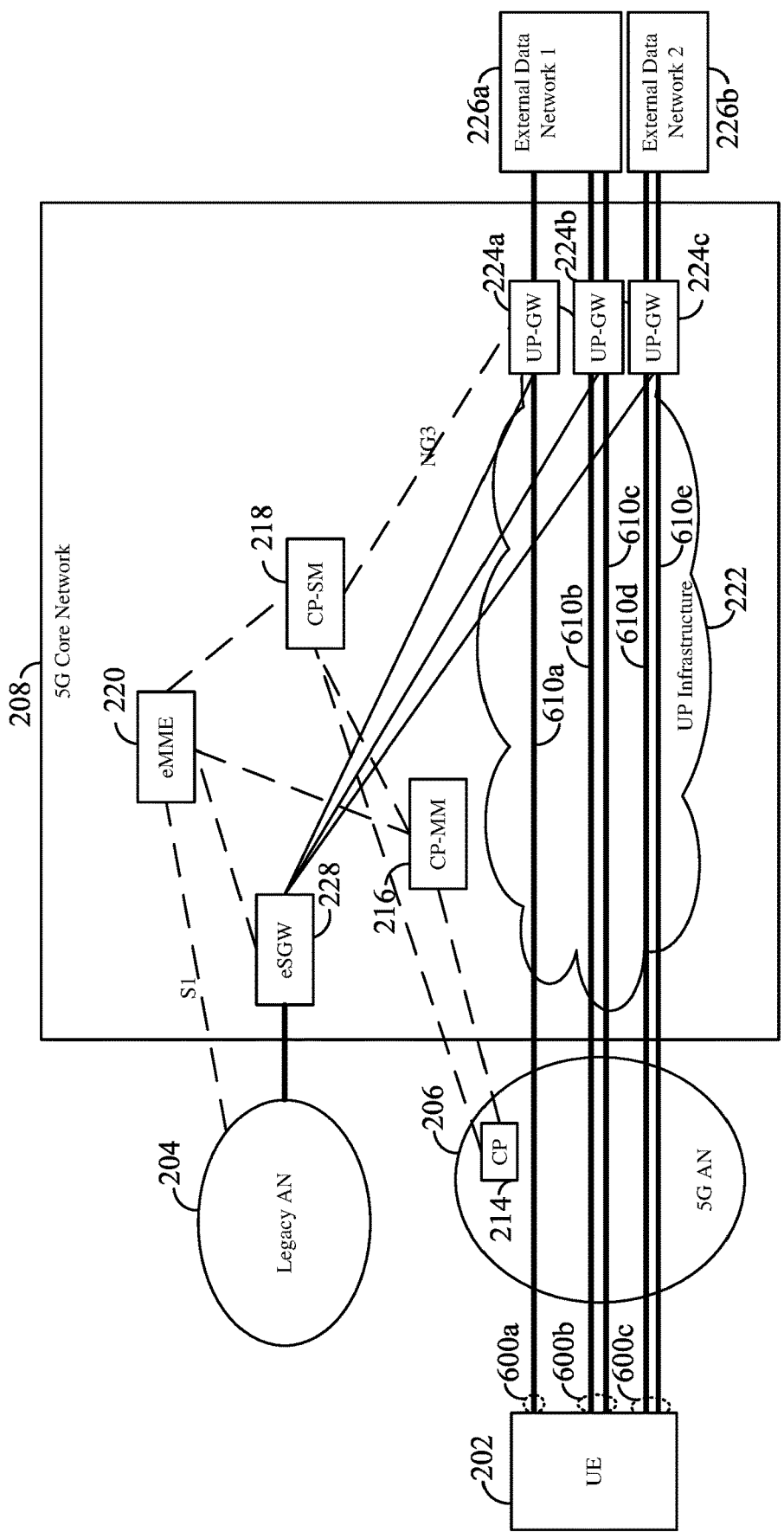
FIG. 6 is a diagram illustrating exemplary data network sessions established over a next generation network that is capable of interworking with a legacy network.

FIG. 6 illustrates another example of a UE 202 engaged in multiple DN Sessions 600*a*-600*c* over a next generation AN 206. Each DN Session 600*a*-600*c* includes one or more IP sessions (IP flows) 610*a*-610*e*, and each IP flow 610*a*-610*e* is associated with a respective IP address for the UE 202. For example, DN Session 600*a* includes IP flow 610*a*, which is served by UP-GW 224*a* and provides connectivity between the UE 202 and a first external data network 226*a* (DN1). DN Session 600*b* includes IP flows 610*b* and 610*c*, which are served by UP-GW 224*b* and provide connectivity between the UE 202 and the first external data network 226*a* (DN1). DN Session 600*c* includes IP flows 610*d* and 610*e*, which are served by UP-GW 224*c* and provide connectivity between the UE 202 and the second external data network 226*b* (DN2).

If the UE 202 roams into an area (tracking area/cell) served by a legacy AN 204, traffic may need to be handed off from the next generation AN to the legacy AN. However, legacy ANs typically support only one IP address for each UE. Therefore, to support multiple DN sessions and multiple IP addresses in legacy networks, IP sessions (IP flows) in next generation networks may be mapped to Packet Data Network (PDN) connections in legacy ANs. To support multiple IP addresses per PDN connection, the UE 202 and eMME 220 enhanced session management (ESM) contexts may each be modified, as described below.

Figure 7:
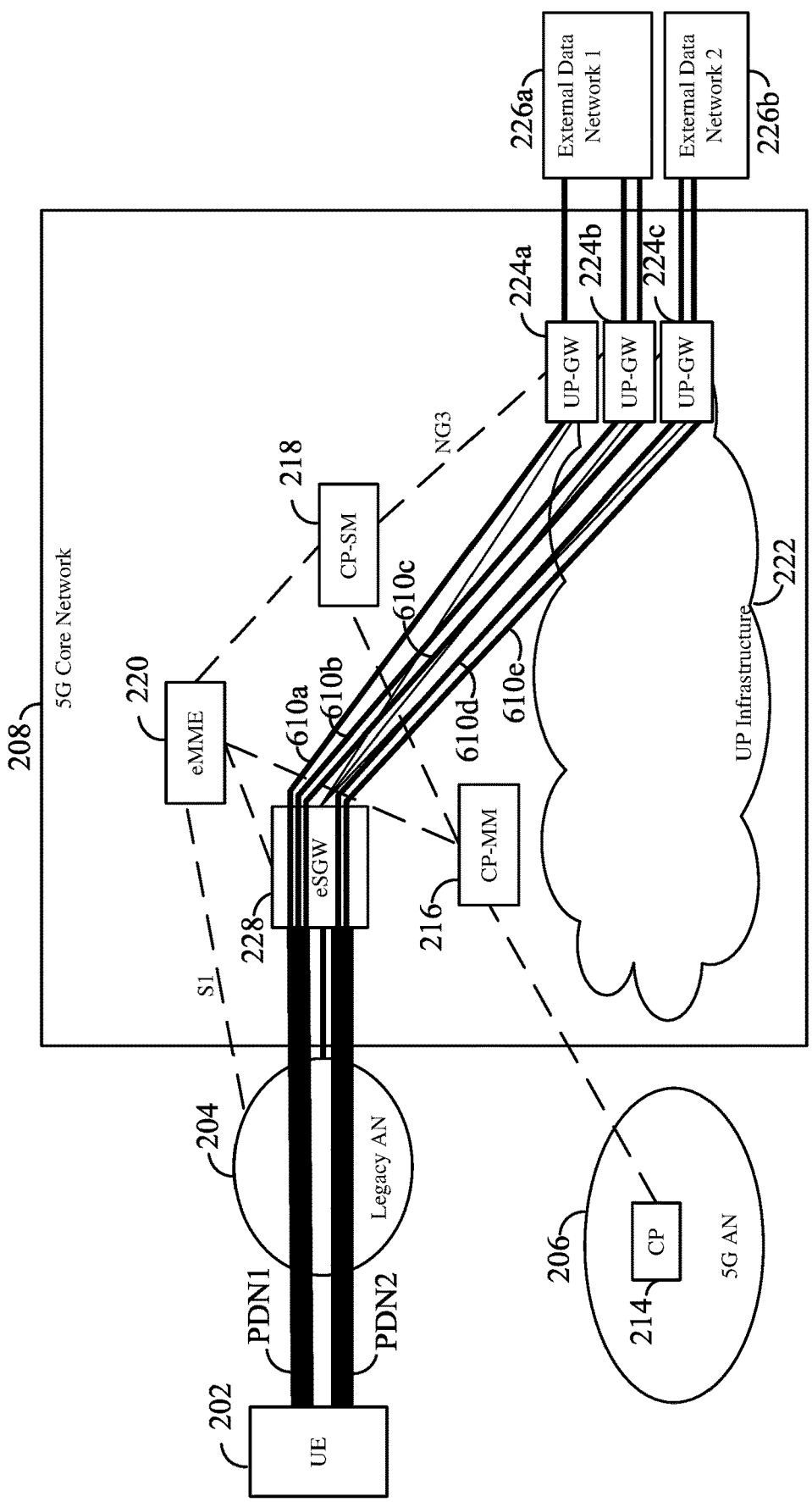
FIG. 7 is a diagram illustrating an exemplary interworking scenario between legacy and next generation networks to handover next generation data network sessions to a legacy wireless access network.

Referring now to FIG. 7, the DN Sessions and IP flows shown in FIG. 6 have each been handed over from the next generation AN 206 to the legacy AN 204. In the example shown in FIG. 7, each IP flow 610*a*-610*e* has been mapped to one of two PDN connections (PDN1 and PDN2). Each PDN connection PDN1 and PDN2 in the legacy AN 204 is an association between the UE 202 and a packet data network 226 (external DN1 or external DN2).

The eMME 220 maps the IP flows 610*a*-610*e* to PDN connections. In various aspects of the present disclosure, the eMME 220 may map each IP flow 610*a*-610*e* to a PDN connection (PDN1 or PDN2) based on at least the external data network associated with the IP flow 610*a*-610*e*. For example, IP flows 610*a*-610*c* may be mapped to PDN1 and IP flows 610*d*-610*e* may be mapped to PDN2 in the eMME 220. In some examples, the characteristics of the IP flows 610*a*-610*e* (e.g., QoS, packet processing requirements, etc.) may further be used to map IP flows 610*a*-610*e* to PDN connections. In this example, more than one PDN connection may be utilized to provide connectivity between the UE 202 and a particular external data network to accommodate different IP flow characteristics.

To facilitate handover of multiple DN Sessions and IP flows, the enhanced session management (ESM) context of the eMME 220 may be modified to support multiple IP addresses on a single PDN connection. Each PDN connection (PDN1 and PDN2) may utilize a Generic Tunneling Protocol (GTP) tunnel on the S1 interface to transmit traffic between the legacy AN 204 and the eSGW 228. In addition, each PDN connection may be represented by a single IP address (IPv4 and/or IPv6) in the legacy AN 204 (e.g., a single IP address may be used for the PDN connection between the UE 202 and the eSGW 228 via the eNB). Thus, PDUs from each IP flow (each having a different IP address) may be encapsulated into PDN PDU's (having the same IP address) for routing over the tunnels.

The eMME 220 provides the mapping to the eSGW 228 to enable the eSGW 228 to map IP flows received on the downlink from UP-GWs 224*a*-224*c* to the corresponding GTP tunnels to the legacy AN 204. On the uplink, PDU's received by the eSGW 228 on PDN1 and PDN2 are mapped to the appropriate IP flows and routed to the appropriate UP-GWs 224*a*-224*c* based on routing information provided by the CP-SM 218. The UE 202 may further be configured with the IP flow-PDN connection mapping to enable the UE 202 to place PDUs on the appropriate PDN connections (e.g., the ESM context in the UE may be modified to map PDUs to PDN connections). For example, the UE 202 may encapsulate IP flow PDU's into PDN PDU's for routing over the appropriate tunnels. The eSGW 228 may decapsulate the PDN PDU's to retrieve the IP flows 610*a*-610*e* for routing to the appropriate UP-GWs 224*a*-224*c*.

Figure 8:
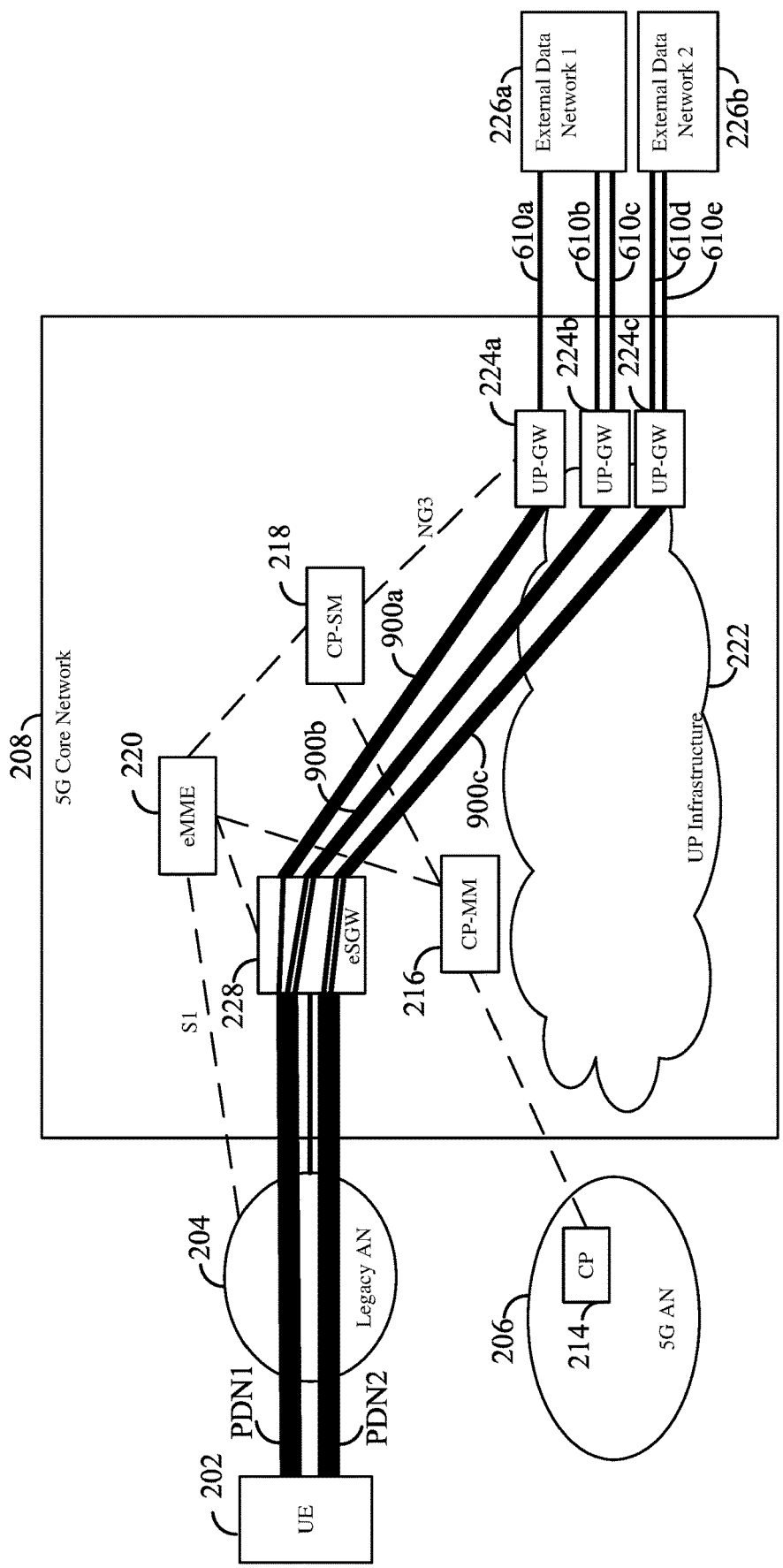
FIG. 8 is a diagram illustrating another exemplary interworking scenario between legacy and next generation networks to handover next generation data network sessions to a legacy wireless access network.

FIG. 8 illustrates another exemplary model for interworking between legacy ANs and next generation core networks after handover from a next generation AN 206 to a legacy AN 204. In the example shown in FIG. 8, GTP tunnels 900*a*-900*c* may also created between the eSGW 228 and the UP-GW 224*a*-224*c*, corresponding to the GTP tunnels within the PDN connections (PDN1 and PDN2). However, if a set of IP flows mapped on a particular PDN connection between the eSGW 228 and the legacy AN 204 is served in the next generation core network 208 by multiple UP-GWs 224, the PDN connection in the next generation core network may be mapped to multiple tunnels from the eSGW 228 to the UP-GWs, corresponding to the actual PDN between the UE 202 and the eSGW 228. For example, PDN1 may be mapped to two tunnels 900*a* and 900*b* to route the IP flows to the appropriate UP-GWs 224*a* and 224*b*. PDN2 may be mapped to a single tunnel 900*c*, since all of the IP flows within PDN2 are served by the same UP-GW 224*c*.

In some examples, the tunnels may be established by the eMME 220 interacting with the CP-SM 218 to provide tunneling information to the eSGW 228 (via the eMME 220)

and UP-GWs 224a-224c (via the CP-SM 218). For example, the eSGW 228 on the UL may map the UL PDUs to the correct tunnel 600a-600c to ensure delivery to the correct UP-GW 224a-224c. To do so, when the handover takes place, the eMME 220, based on information from the CP-SM 218 and/or CP-MM 216, may configure the eSGW 228 with mapping information between UL IP flows and the tunnels 900a-900c from the eSGW 228 to the UP-GWs 224a-224c. The eSGW 228 may further be configured to correctly map PDUs from the tunnels 900a-900c from one or more UP-GWs 224a-224c to the correct PDN connection (PDN1 or PDN2) between the eSGW 228 and the legacy eNB.

In some examples, either the CP-MM 216/CP-SM 218 or the next generation AN 206 may control the handover. If the CP-MM 216/CP-SM 218 controls the handover, in one example, the next generation AN 206 may provide the identity of a target cell in the legacy AN 204 to the CP-MM 216 and/or CP-SM 218. The CP-MM 216 and/or CP-SM 218 may then select a target eMME 220 based on the target cell identity (e.g., the CP-MM 216 and/or CP-SM 218 may be configured with a mapping between a target cell ID and the corresponding eMME 220, at least for target cells neighboring the next generation AN 206). In this example, the CP-MM 216 and/or CP-SM 218 have awareness of the legacy/next generation AN 204/206 technologies and the topology of the access networks.

In other examples, when the CP-MM 216/CP-SM 218 controls the handover, the next generation AN 206 may select the target eMME 220 based on the identity of the target cell (i.e., next generation ANs 206 are configured with a mapping between the target cell ID and the corresponding eMME 220, at least for target cells neighboring the next generation AN 206). The next generation AN 206 may then trigger the handover to the CP-MM 216 and/or CP-SM 218. In this example, the CP-MM 216 and/or CP-SM 218 may not have awareness of the legacy/next generation AN 204/206 technologies and the topology of the access networks.

However, if the next generation AN 206 controls the handover, the next generation AN 206 may select the target eMME 220 based on the identity of the target cell (i.e., next generation ANs 206 may be configured with a mapping between the target cell ID and the corresponding eMME 220, at least for target cells neighboring the next generation AN 206). The target eMME 220 may then interact with the serving CP-MM 216 and CP-SM 218 to authorize the handover and establish or modify the network connectivity (e.g., tunnels).

If the UE 202 is capable of connecting to both the next generation AN 206 and the legacy AN 204 simultaneously and perform a make before break handover, the UE 202 may initiate the handover by connecting to the legacy AN 204, attaching to the next generation core network 208 (possibly with an indication a handover is being performed), and establishing PDN connectivity (possibly with an indication a handover is being performed). The eMME 220 selected to serve the UE 202 by the MME/eNB (shown in FIG. 2) may then interact with the serving CP-MM 216 and/or serving CP-SM 218 to retrieve the UE context. The eMME 220 may discover the serving CP-MM 216 and/or serving CP-SM 218, for example, based on identifiers provided by the UE in the connectivity/attach request. In some examples, the eMME 220 translates the identifiers provided by the UE into the addresses of the CP-MM 216 and/or CP-SM 218.

In any of the above scenarios, the eMME 220 may appear to the CP-MM 216/CP-SM 218 as either another next generation AN or as another CP-MM 216/CP-SM 218. If the eMME 220 appears as another next generation network, the interface between the eMME 220 and the CP-MM 216/CP-SM 218 may be the same as the interface between the CP-MM 216/CP-SM 218 and the next generation AN 206. In examples in which the CP-MM 216 and/or CP-SM 218 controls the handover, upon receiving a handover trigger from the next generation AN 206 (e.g., source AN), the CP-MM 216 and/or CP-SM 218 may perform the handover to the eMME 220 (e.g., target AN). When connectivity is established for the handover, the CP-MM 216 and/or CP-SM 218 may address the eMME 220 the same as if the handover were performed between two next generation ANs. In examples in which the next generation AN controls the handover, the source AN 206 may trigger the handover to the target AN (eMME 220), and either AN (source or target) may interact with the serving CP-MM 216 and/or CP-SM 218 to perform the handover. However, if the eMME 220 appears as another CP-MM 216 and/or CP-SM 218, handover and connectivity establishment procedures may be performed the same as a handover between two next generation networks that require CP-MM 216 and/or CP-SM 218 relocation.

In addition, in any of the above scenarios, if the eMME 220 acts as an anchor for the MM and SM context, after the handover, the previously serving CP-MM 216 and CP-SM 218 may be released and both the MM and SM contexts may be anchored in the eMME 220. However, if the context is anchored in a CP-MM 216 and/or CP-SM 218, the serving CP-MM 216 and/or CP-SM 218 may continue to serve the UE 202 while connected to the legacy cell, with control signaling between the UE 202 and the CP-SM 218 and CP-MM 216 routed via the eMME 220.

Although all IP flows 610a-610e in FIGS. 7 and 8 were handed over from the next generation AN 206 to the legacy AN 204, in some examples, not all IP flows may be transferable to legacy ANs. The CP-MM 216 and/or CP-SM 218 may determine whether or not each IP flow 610a-610e is transferable to the legacy AN 204 based on, for example, local configuration by the operator, the UE subscription profile (which may contain restrictions on the transferability of certain types of IP flows), an indication by the UE when the data connectivity (for an IP flow or a set of IP flows) is established, and other factors. For the IP flows 610a-610e that are transferable, the CP-MM 216 and/or CP-SM 218 provides the QoS parameters for the transferred IP flows to the eMME 220. The QoS parameters may include next generation QoS parameters and legacy QoS parameters, as described above.

In next generation core networks, traffic (i.e., PDUs) may be labeled with tokens (one for the uplink (UL) and/or one for the downlink (DL)) for traffic differentiation. For example, an UL token may be generated by the core network, and delivered to the UE for uplink traffic. The UL token may be consumed by the UP-GW 224 for traffic verification. The UL token may further be consumed by the next generation AN 206 for traffic verification and filtering. A DL token may be generated in conjunction with an application server that generates DL traffic, and is delivered to the application server. The DL token may be further consumed by the UP-GW 224 for DL traffic verification and filtering (i.e., to verify if the traffic is authorized and what policies should be applied, including QoS). The DL token may further be consumed by the next generation AN 206 to enable matching between the PDU and the AN resources needed to transport the PDU over the access link.

To provide interworking with legacy ANs for tokens, the UL and DL tokens may be delivered by the next generation core network to the eMME 220 and eSGW 228 and used in the same way before mapping to PDN connections. In order to deliver the tokens to the UE over the legacy AN, NAS signaling over the legacy AN may be enhanced to carry the tokens. In some examples, the legacy AN (eNB) may not process the tokens, but instead merely forward the tokens without processing. If the UE 202 receives the UL token when connected to the legacy AN 204, the UE 202 may apply the token (i.e., insert it) in all PDU's corresponding to the IP data flow(s) the token is associated with.

Figure 9:
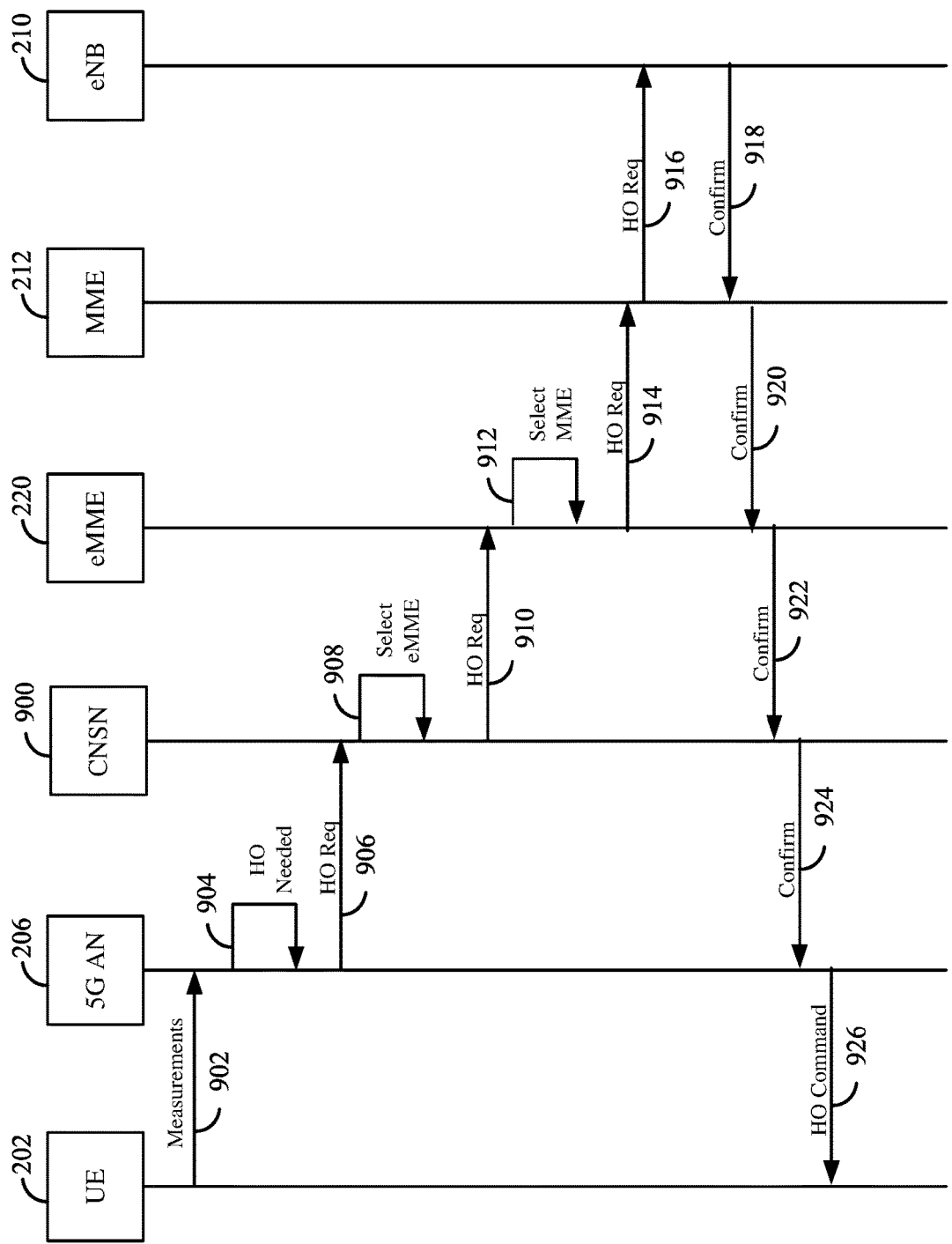
FIG. 9 is a signaling diagram illustrating exemplary signaling for performing a handover from a next generation access network to a legacy access network.

In either FIG. 7 or FIG. 8, the handover from the next generation AN 206 to the legacy AN 204 may be initiated by the next generation AN 206 or by the UE 202. If the next generation AN 206 initiates the handover, a handover trigger is provided by the next generation AN 206 to the eMME 220. For example, referring now to the signaling diagram of FIG. 9, at 902, the next generation AN 206 may receive measurement information from the UE, including measurements for legacy cells. From the measurement information, at 904, the next generation AN 206 may determine that a handover is needed and select the target cell (i.e., a legacy cell). At 906, the next generation AN triggers the handover towards a core network serving node 900 (CP-MM and/or CP-SN) and provides a descriptor of next generation AN resources (e.g., configuration of radio bearers, security information, etc.).

If the target cell is a legacy cell, the next generation AN 206 may select the eMME 220 based on the target cell ID and provide the identity of the eMME 220 to the core network serving node 900 or the core network serving node 900 may select the eMME based on the target cell ID, as shown at 908. At 910, the core network serving node 900 may forward the handover request to the eMME 220. The eMME 220 may process the handover request or, as shown at 912 in FIG. 9, identify an MME 212 for processing the handover request based on the target cell ID. If the eMME 220 selects an MME 212 for processing the handover request, at 914, the eMME 220 may then forward the handover request to the MME 212. Either the MME 212 or the eMME 220 (e.g., if the eMME continues to serve the UE 202 in the target legacy cell) may then forward the handover request to the target eNB 210. The eMME 220 may further convert the next generation AN resources information into legacy access information and, if the eMME 220 selected an MME 212, provide the legacy access information to the MME. The next generation AN 206 or the core network serving node 900 may further provide to the MME 212 legacy specific QoS parameters established when the QoS was established in the next generation AN 206. When the handover is successfully completed, at 918 and 920, a confirmation message is returned by the eNB 210 to the MME 212 and eMME 220, which forwards the confirmation to the core network serving node 900 at 922. The core network serving node 900 may then forward the confirmation to the next generation AN 206 at 924, which provides a handover command to the UE 202 at 926.

Figure 10:
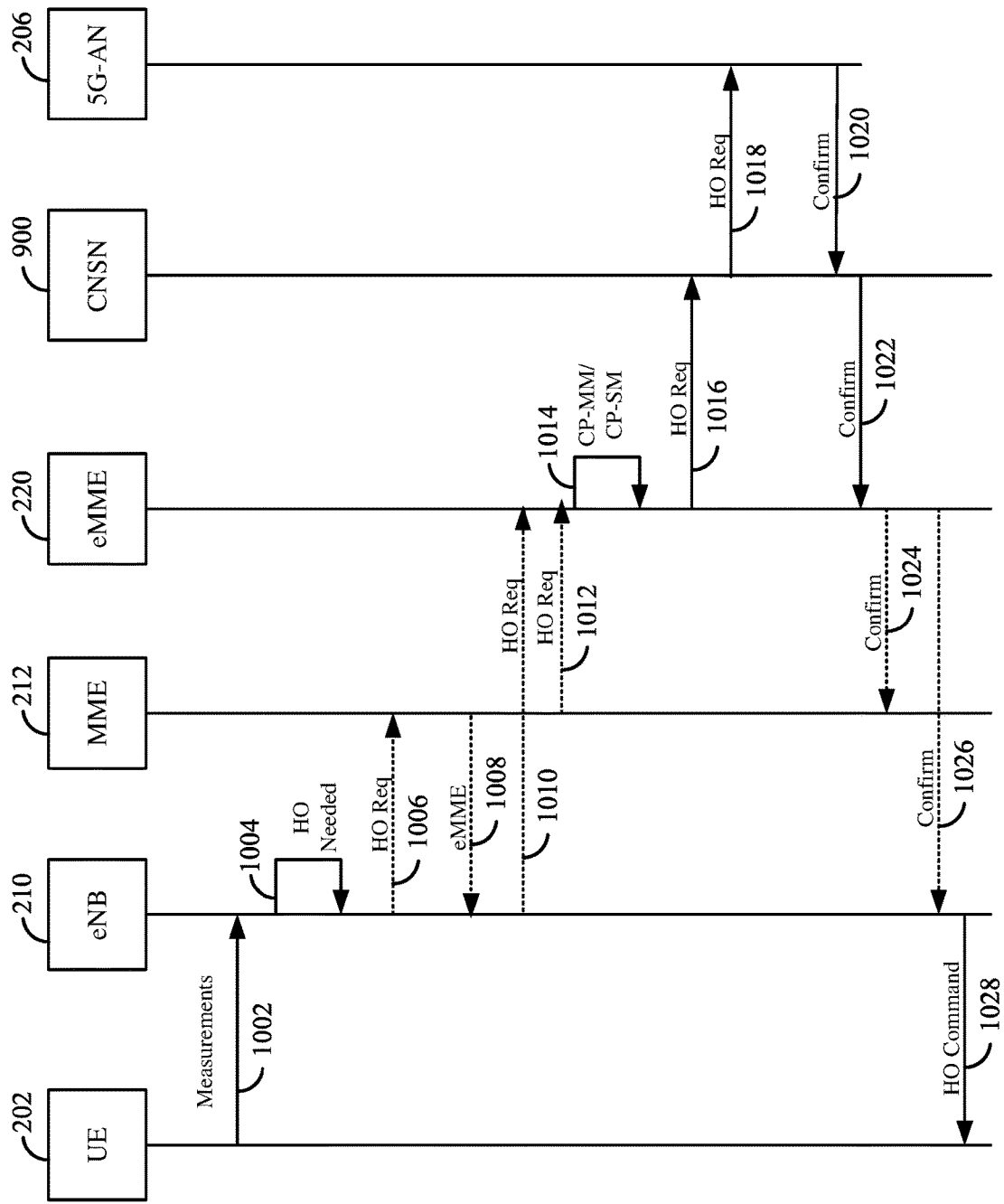
FIG. 10 is a signaling diagram illustrating exemplary signaling for performing a handover from a legacy access network to a next generation access network.

For a handover from a legacy cell (legacy AN 204) to a next generation AN 206, the handover may be initiated by the legacy AN 204 or by the UE 202. If the legacy AN 204 initiates the handover, a handover trigger is provided by the legacy AN 204 to the eMME 220. For example, referring now to the signaling diagram of FIG. 10, at 1002, the eNB 210 may receive measurement information from the UE, including measurements for next generation AN cells. From the measurement information, at 1004, the eNB 210 may determine that a handover is needed and select the target cell. If the target cell is a next generation cell, the eNB 210 triggers the handover towards the eMME 220, including the information exchanged between the legacy eNB and next generation eNB 210 for inter-eNB handover (e.g., configuration of radio bearers, security information, etc.). The eNB 210 may be configured with the address of the eMME 220, as shown at 1010, or the eNB 210 may forward the handover request to the MME 212, which is configured to detect that the target cell is a next generation cell and to select a corresponding eMME 220 for the handover, as shown at 1006. The MME 212 may then either redirect the eNB 210 to send the handover request to the eMME 220, as shown at 1008 and 1010, or forward the handover request to the eMME (as in an inter-MME handover), as shown at 1012. In some examples, the MME 212 may be configured as an eMME, in which case, redirection to the eMME 220 is not necessary.

The eMME 220 (or MME 212) uses the target cell ID to select a core network serving node 900 (CP-SM and/or CP-MM) at 1014. The eMME 220 (or MME 212) may further convert the information provided by the eNB 210 (e.g., configuration of radio bearers) into next generation configuration information for the target next generation AN, and forward the handover request containing the converted information to the core network serving node 900 at 1016. The core network serving node then selects the next generation AN corresponding to the target cell ID and continues the handover preparation at 1018. When the handover is successfully completed, at 1020, a confirmation message is returned by the target next generation AN to the core network serving node 900, which forwards the confirmation to the eMME 220 at 1022. The eMME 220 may then forward the confirmation to either the MME 212 at 1024 or the eNB 210 at 1026, which provides a handover command to the UE 202 at 1028.

In some examples, if the eMME 220 is acting as a CP-MM 216 and/or CP-SM 218, for CP-MM 216 and/or CP-SM 218 controlled handovers, the eMME 220 selects a target CP-MM 216 and/or CP-SM 218 based on the identity of the target cell. For example, the eMME 220 may be configured with a mapping between a target cell ID and the corresponding CP-MM and/or CP-SM, at least for target cells neighboring the legacy AN 204. The eMME 220 may then forward the handover request to the target CP-MM and/or CP-SM. For a legacy AN controlled handover, the eMME 220 may select the target next generation AN 206 based on the identity of the target cell (e.g., the eMME may be configured with a mapping between the target cell ID and the corresponding next generation AN, at least for target ANs neighboring the source legacy cell), and trigger the handover to the target next generation AN. The target next generation AN may then interact with a CP-MM and/or CP-SM to establish the connectivity and context. If a CP-SM is an anchor for the SM context, the eMME 220 forwards the handover request to the current CP-MM and/or CP-SM to establish the connectivity with the target next generation AN.

As discussed above, when the legacy AN 204 triggers the handover to a next generation AN, the eNB may forward the handover signaling to the eMME 220. To enable forwarding of the handover signaling to the eMME 220, the identifiers of the target cells should map to an area that requires the eMME 220 for the handover signaling. Thus, when assigning cell identifiers to next generation AN cells that overlap with legacy cells, in some examples, the identifiers of the next generation cells may correspond to a different coverage area (e.g., tracking area or zone) than the legacy cells.

If the UE 202 is capable of connecting to both the next generation AN 206 and the legacy AN 204 simultaneously and perform a make before break handover, the UE 202 may initiate the handover by connecting to the next generation AN 206, attaching to the next generation core network 208 (possibly with an indication a handover is being performed), and establishing connectivity (possibly with an indication a handover is being performed). The CP-MM 216 and CP-SM 218 selected to serve the UE 202 may interact with the serving eMME 220 to retrieve the UE context. If the context was anchored in a CP-MM and/or CP-SM, a new serving CP-MM and/or serving CP-SM may not be selected, and the existing CP-MM and/or CP-SM may be selected by the next generation core network based on identifiers provided by the UE in the connectivity/attach request or by translating the identifiers into the addresses of the existing CP-MM and/or CP-SM. In any of the above scenarios, after the handover from the legacy AN 204 to the next generation AN 206, the context in the eMME 220 and eSGW 228 is released.

Figure 11:
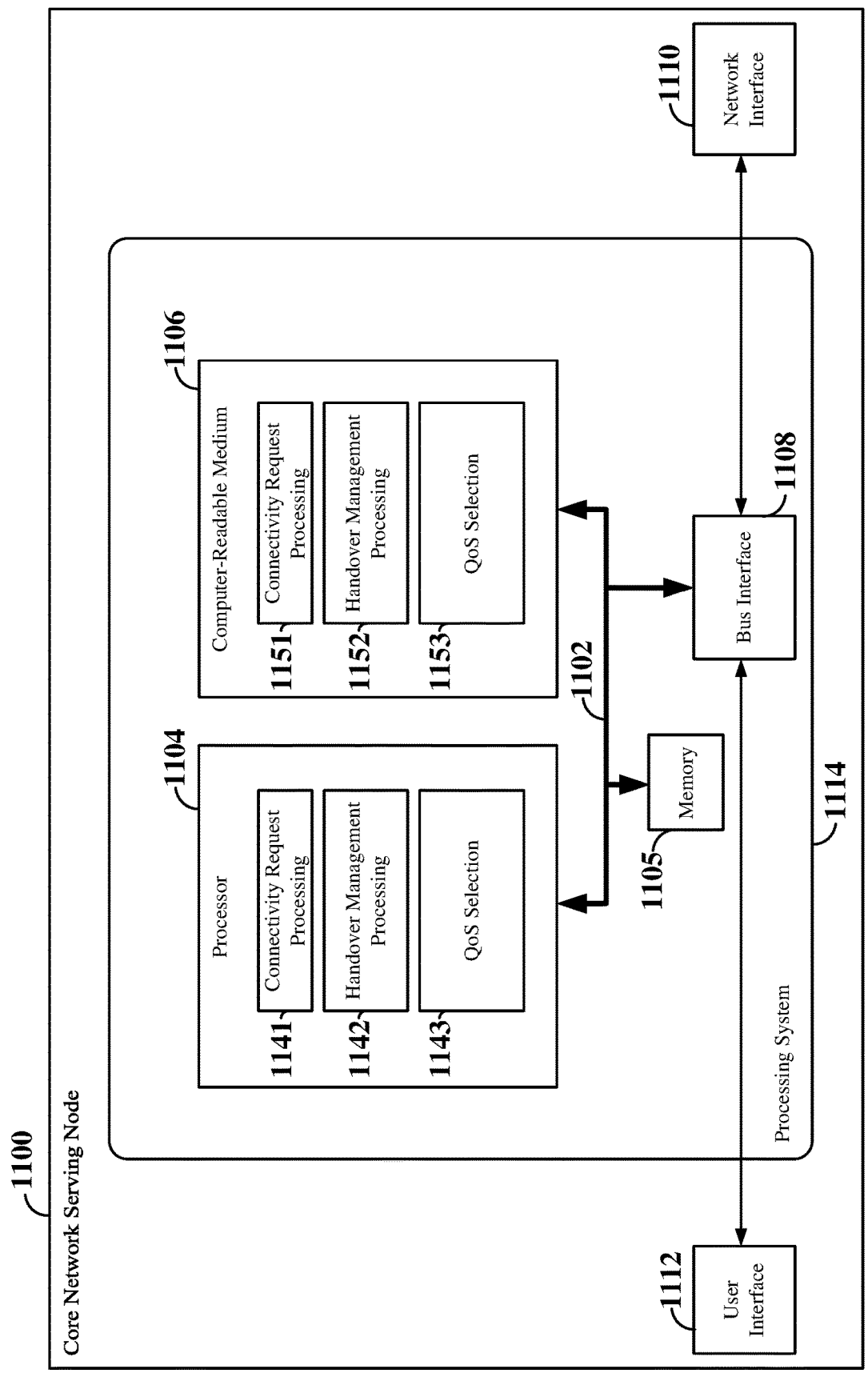
FIG. 11 is a block diagram conceptually illustrating an example of a core network serving node according to some embodiments.

FIG. 11 is a conceptual diagram illustrating an example of a hardware implementation for a core network serving node 1100 employing a processing system 1114. In accordance with various aspects of the disclosure, an element, or any portion of an element, or any combination of elements may be implemented with a processing system 1114 that includes one or more processors 1204. The core network serving node 1100 may correspond to, for example, the MME, CP-MM, CP-SM, eMME or eSGW.

Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 1104, as utilized in the core network serving node 1100, may be used to implement any one or more of the processes described below.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 links together various circuits including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, will not be described any further. A bus interface 1108 provides an interface between the bus 1102 and a network interface 1110. The network interface 1110 provides a means for communicating with various other apparatus over a transmission medium. Depending upon the nature of the apparatus, a user interface 1112 (e.g., keypad, display, touch screen, speaker, microphone, joystick) may also be provided.

The processor 1104 is responsible for managing the bus 1202 and general processing, including the execution of software stored on the computer-readable medium 1106. The software, when executed by the processor 1204, causes the processing system 1114 to perform the various functions described below for any particular apparatus. The computer-readable medium 1106 may also be used for storing data that is manipulated by the processor 1104 when executing software.

In some aspects of the disclosure, the processor 1104 may include connectivity request processing circuitry 1141 configured to receive and process connectivity requests from UEs. The connectivity requests may be received from the UE or an interworking gateway between the UE and the next generation core network, and may be included in NAS messages. The connectivity requests may include an attach request and may contain a set of capabilities of the UE. The set of capabilities may include, for example, an indication of whether the UE supports legacy and/or next generation RATs and an indication of whether the UE supports an inter-RAT handover (i.e., between legacy and next generation ANs) initiated by the UE. The connectivity request processing circuitry 1141 may process the request based on the UE capabilities, the UE profile, network policies and other factors.

In some examples, the core network serving node 1100 may be a CP-SM, CP-MM and/or eMME that receives a connectivity request from a UE within a next generation wireless access network (AN). The connectivity request processing circuitry 1141 may use the set of capabilities, a UE profile, network policies, and other factors, to select a Quality of Service (QoS) associated with the connectivity to the UE. The QoS parameters may include both legacy and next generation QoS parameters. The connectivity request processing circuitry 1141 may then establish a data network session (DNS) connection between the UE and an external data network over the next generation AN via the next generation core network.

In some examples, the core network serving node 1100 may be an MME that receives a connectivity request from a UE within a legacy wireless access network (AN). Based on the set of capabilities, the connectivity request processing circuitry 1141 may determine that the UE supports the next generation RAT, select an eMME (interworking core network serving node) serving the current tracking area of the UE associated with the legacy AN, and redirect the connectivity request to the selected eMME. For example, the connectivity request processing circuitry 1141 may access a configuration table (e.g., within memory 1105) maintaining a list of eMMEs and select the eMME from the list.

In some examples, the core network serving node 1100 may be an interworking core network serving node (i.e., eMME) that receives a connectivity request from a UE within a legacy AN. The connectivity request may be redirected to the eMME from an MME within a legacy core network. The connectivity request processing circuitry 1141 may process the connectivity request and select one or more Quality of Service (QoS) parameters, which may include both legacy and next generation QoS parameters, to be associated with the connectivity to the UE. The connectivity request processing circuitry 1141 may further authenticate the UE and/or trigger an MM context establishment towards a next generation core network serving node (e.g., CP-MM) to perform authentication of the UE. The connectivity request processing circuitry 1141 may further establish a packet data network (PDN) connection over the legacy AN between the UE and a UP-GW via the next generation core network. During the PDN connection establishment, the eMME may act as a CP-SM or the connectivity request processing circuitry may involve a CP-SM to anchor the SM context. The connectivity request processing circuitry 1141 may operate in coordination with connectivity request processing software 1151.

The processor 1104 may further include handover management processing circuitry 1142 configured to determine whether the UE supports a UE-initiated inter-RAT handover based on the set of capabilities and to determine whether the next generation core network supports a UE-initiated inter-RAT handover. The handover management processing circuitry may further provide an indication to the UE or the interworking gateway of whether the next generation core network support a UE-initiated inter-RAT handover upon successfully establishing connectivity to the UE.

In some examples, the core network serving node 1100 is a CP-MM or CP-SM that receives a handover request from a next generation AN indicating that a handover should be performed from the next generation AN to a legacy AN for a UE currently served by the next generation AN. The handover request may include, for example, the cell ID of the target cell in the legacy AN, a descriptor of next generation AN resources (e.g., configuration of radio bearer, security information, etc.), and other information. The handover management processing circuitry 1142 may then determine the identity of an eMME to process the handover request. For example, the identity of the eMME may be included in the handover request or the handover management processing circuitry 1142 may determine the identity of the eMME based on the target cell ID of the legacy AN. The handover management processing circuitry 1142 may then forward the handover request to the eMME for further processing.

In some examples, the core network serving node 1100 is an eMME that receives the handover request from the CP-MM or CP-SM. In this example, the handover management processing circuitry 1142 may identify an MME and target eNB within the legacy core network based on the target cell ID and forward the handover request to the MME and target eNB. In addition, the handover management processing circuitry 1142 may further convert next generation AN resources information into legacy access information and provide the legacy access information to the MME. The handover management processing circuitry 1142 may further provide to the MME legacy specific QoS parameters established when the QoS was established in the next generation AN.

In addition, the handover management processing circuitry 1142 in the eMME may further map next generation IP flows to PDN connections. In various aspects of the present disclosure, the handover management processing circuitry 1142 may map each IP flow to a PDN connection based on at least the external data network associated with the IP flow. In some examples, the characteristics of the IP flows (e.g., QoS, packet processing requirements, etc.) may further be used to map IP flows to PDN connections. In some examples, multiple IP addresses (multiple IP flows) may be supported on a single PDN connection.

The handover management processing circuitry 1142 may provide mapping information indicating the mapping of IP flows to PDN connections (e.g., GTP tunnels) to the eSGW in the next generation core network to enable the eSGW to map IP flows received on the downlink from UP-GWs to the corresponding PDN connections (e.g., GTP tunnels) to the legacy AN. On the uplink, PDU's received by the eSGW may also be mapped to the appropriate IP flows or GTP tunnels and routed to the appropriate UP-GWs based on the mapping information. Thus, in examples in which the core network serving node 1100 is an eSGW, the handover management processing circuitry 1242 may utilize the mapping information to map IP flows to PDN connections and GTP tunnels within the PDN connections.

In some examples, the core network serving node 1100 is an eMME that receives a handover request from a legacy AN (e.g., legacy eNB) or legacy MME. In this example, the handover request may be requesting a handover of a UE from a legacy AN to a next generation AN. The handover management processing circuitry 1142 may use the target cell ID (of the next generation target cell) to select a CP-MM and/or CP-SM and forward the handover request to the CP-MM and/or CP-SM. The handover management processing circuitry 1142 may further convert handover information (e.g., configuration of radio bearers, etc.) provided by the legacy AN/legacy MME into next generation configuration information and include the next generation configuration information in the handover request sent the CP-MM and/or CP-SM.

In some examples, the core network serving node 1100 is a CP-MM and/or CP-SM that receives the handover request from the eMME. In this example, the handover request may be requesting a handover of a UE from a legacy AN to a next generation AN. The handover management processing circuitry 1142 may select a next generation AN corresponding to the target cell ID and interact with the next generation AN to establish the connectivity and context for the handover. The handover management processing circuitry 1142 may operate in coordination with handover management processing software 1152.

The processor 1104 may further include QoS selection circuitry 1143 configured to select one or more QoS parameters to associate to the connectivity to the UE. The QoS selection circuitry 1143 may select one or more QoS parameters and establish values for the one or more selected QoS parameters based on the UE capabilities and network policies. In some examples, if the set of capabilities indicates that the UE supports the legacy RAT and includes one or more QoS parameters used in legacy networks (e.g., Guaranteed Bit Rate (GBR) and/or specific QoS Class Identifiers (CQIs)), the QoS selection circuitry 1143 may select one or more QoS parameters associated with the next generation core network and one or more QoS parameters associated with the legacy AN to enable interworking with the legacy network in case of a handover from the next generation AN to the legacy AN. The QoS selection circuitry 1143 may store the QoS parameters within, for example, memory 1105 or may forward the QoS parameters to another core network serving node (e.g., CP-MM and/or CP-SM) upon connectivity establishment. The QoS selection circuitry 1143 may further provide the QoS parameters to the eMME upon handover to a legacy AN. The QoS selection circuitry 1143 may operate in coordination with QoS selection software 1153.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1106. The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 12:
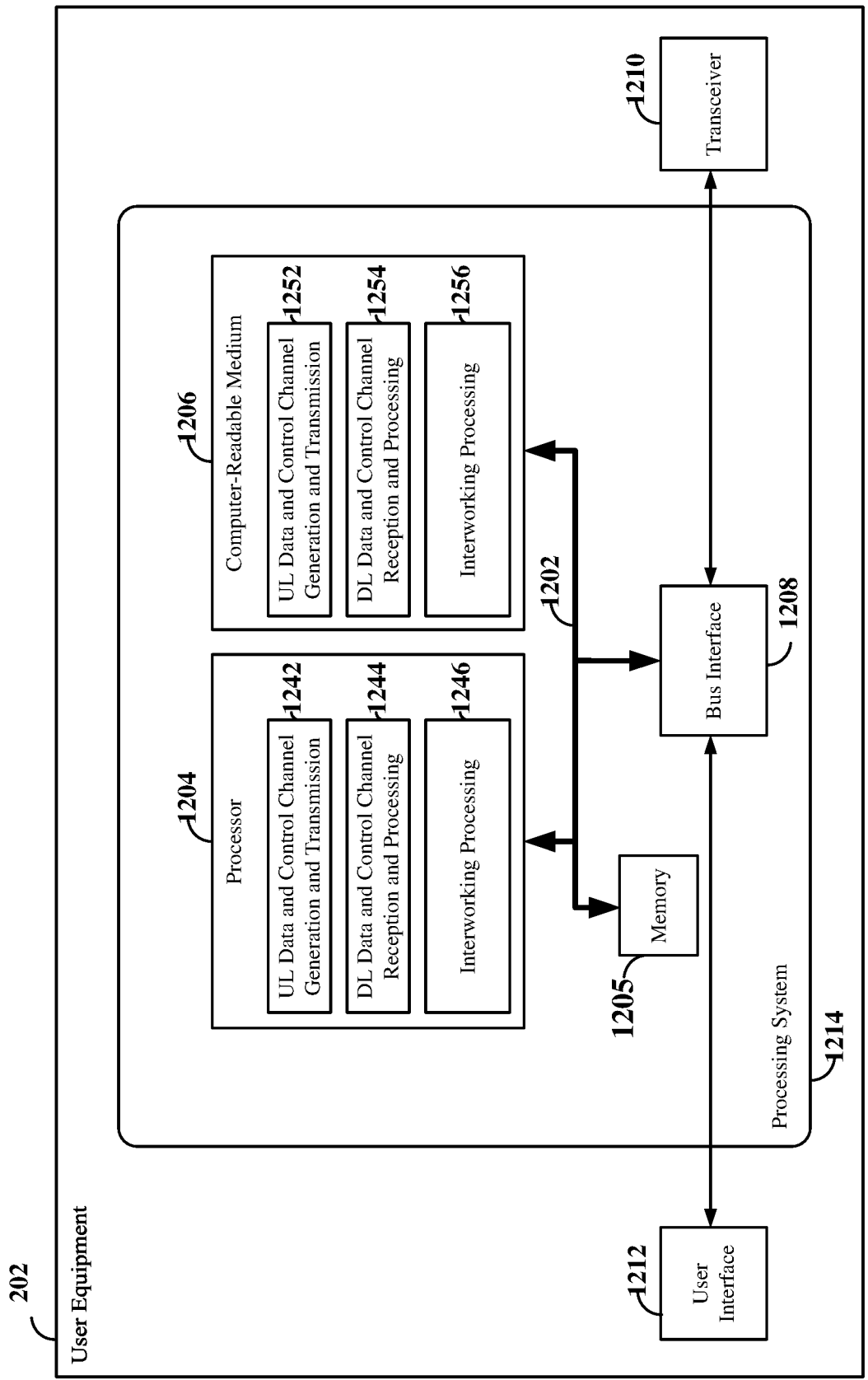
FIG. 12 is a block diagram conceptually illustrating an example of a user equipment according to some embodiments.

FIG. 12 is a conceptual diagram illustrating an example of a hardware implementation for an exemplary UE 202 employing a processing system 1214. In accordance with various aspects of the disclosure, an element, or any portion of an element, or any combination of elements may be implemented with a processing system 1214 that includes one or more processors 1204.

The processing system 1214 may be substantially the same as the processing system 1114 illustrated in FIG. 11, including a bus interface 1208, a bus 1202, memory 1205, a processor 1204, and a computer-readable medium 1206. Furthermore, the UE 202 may include a user interface 1212 and a transceiver 1210 for communicating with various other apparatus over a transmission medium (e.g., air interface). The processor 1204, as utilized in a UE 202, may be used to implement any one or more of the processes described below.

In some aspects of the disclosure, the processor 1204 may include uplink (UL) data and control channel generation and transmission circuitry 1242, configured to generate and transmit uplink data on an UL data channel, and to generate and transmit uplink control/feedback/acknowledgement information on an UL control channel. The UL data and control channel generation and transmission circuitry 1242 may operate in coordination with UL data and control channel generation and transmission software 1252. The processor 1204 may further include downlink (DL) data and control channel reception and processing circuitry 1244, configured for receiving and processing downlink data on a data channel, and to receive and process control information on one or more downlink control channels. In some examples, received downlink data and/or control information may be stored within memory 1205. The DL data and control channel reception and processing circuitry 1244 may operate in coordination with DL data and control channel reception and processing software 1254.

The processor 1204 may further include interworking processing circuitry 1246, configured for interworking between a legacy AN and a next generation core network. The interworking processing circuitry 1246 may transmit a connectivity request (including an attach request) to the next generation core network through a wireless access network (legacy or next generation). If through a legacy AN, the connectivity request may be sent within NAS messages. The connectivity request may include a set of capabilities of the UE, including an indication of whether the UE supports legacy and/or next generation RATs and an indication of whether the UE supports an inter-RAT handover (i.e., between legacy and next generation ANs) initiated by the UE. The interworking processing circuitry 1246 may further receive an indication of whether the next generation core network supports UE-initiated inter-RAT handovers.

In some examples, the interworking processing circuitry 1246 may further receive IP flow-PDN connection mapping information upon a handover from a next generation AN to a legacy AN. The interworking processing circuitry 1246 may further encapsulate IP flow PDU's into PDN PDU's for routing over the appropriate tunnels. The interworking processing circuitry 1246 may further operate in coordination with interworking processing software 1256.

One or more processors 1204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1206. The computer-readable medium 1206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 1206 may reside in the processing system 1214, external to the processing system 1214, or distributed across multiple entities including the processing system 1214. The computer-readable medium 1206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 13:
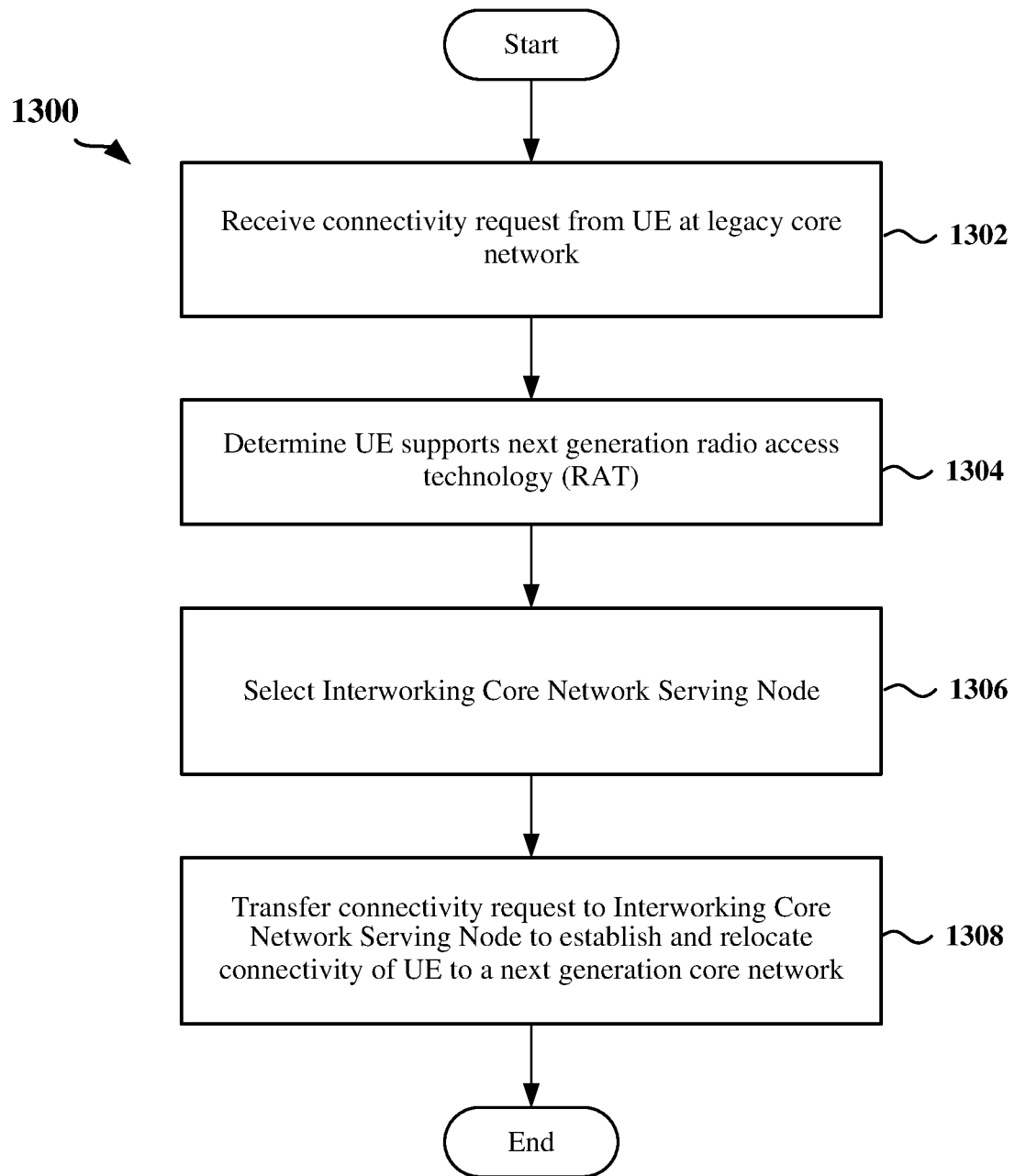
FIG. 13 is a flow chart of a method for interworking between core networks in a communication network.

FIG. 13 is a flow chart 1300 of a method for interworking between core networks in a communication network. As described below, some or all illustrated features may be omitted in a particular implementation within the scope of the present disclosure, and some illustrated features may not be required for implementation of all embodiments. In some examples, the method may be performed by a legacy core network serving node, such as a MME, as described above and illustrated in FIG. 11, by a processor or processing system, or by any suitable means for carrying out the described functions.

At block 1302, the legacy core network serving node (e.g., MME) may receive a connectivity request from a UE via a legacy wireless access network (AN) utilizing a legacy RAT. For example, the MME in the legacy core network may receive a non-access stratum (NAS) message including a set of capabilities of the UE. The set of capabilities may include, for example, an indication of whether the UE supports legacy and/or next generation RATs and an indication of whether the UE supports an inter-RAT handover (i.e., between legacy and next generation ANs) initiated by the UE.

At block 1304, the MME may determine that the UE supports a second RAT. For example, the MME may determine that the UE supports a next generation RAT based on the set of capabilities of the UE and/or a user profile/subscription. At block 1306, the MME may select an interworking core network serving node (e.g., eMME) for interworking between the legacy core network and a next generation core network supporting the next generation RAT, and at block 1308, transfer the connectivity request to the eMME to establish and relocate connectivity of the UE to the next generation core network. For example, the MME may access a configuration table maintaining a list of eMMEs and select the eMME that serves a current tracking area of the UE associated with the legacy wireless AN. The MME may then forward the connectivity request to the selected eMME or redirect the connectivity request to the selected eMME via the legacy AN and an interworking serving gateway (eSGW).

Figure 14:
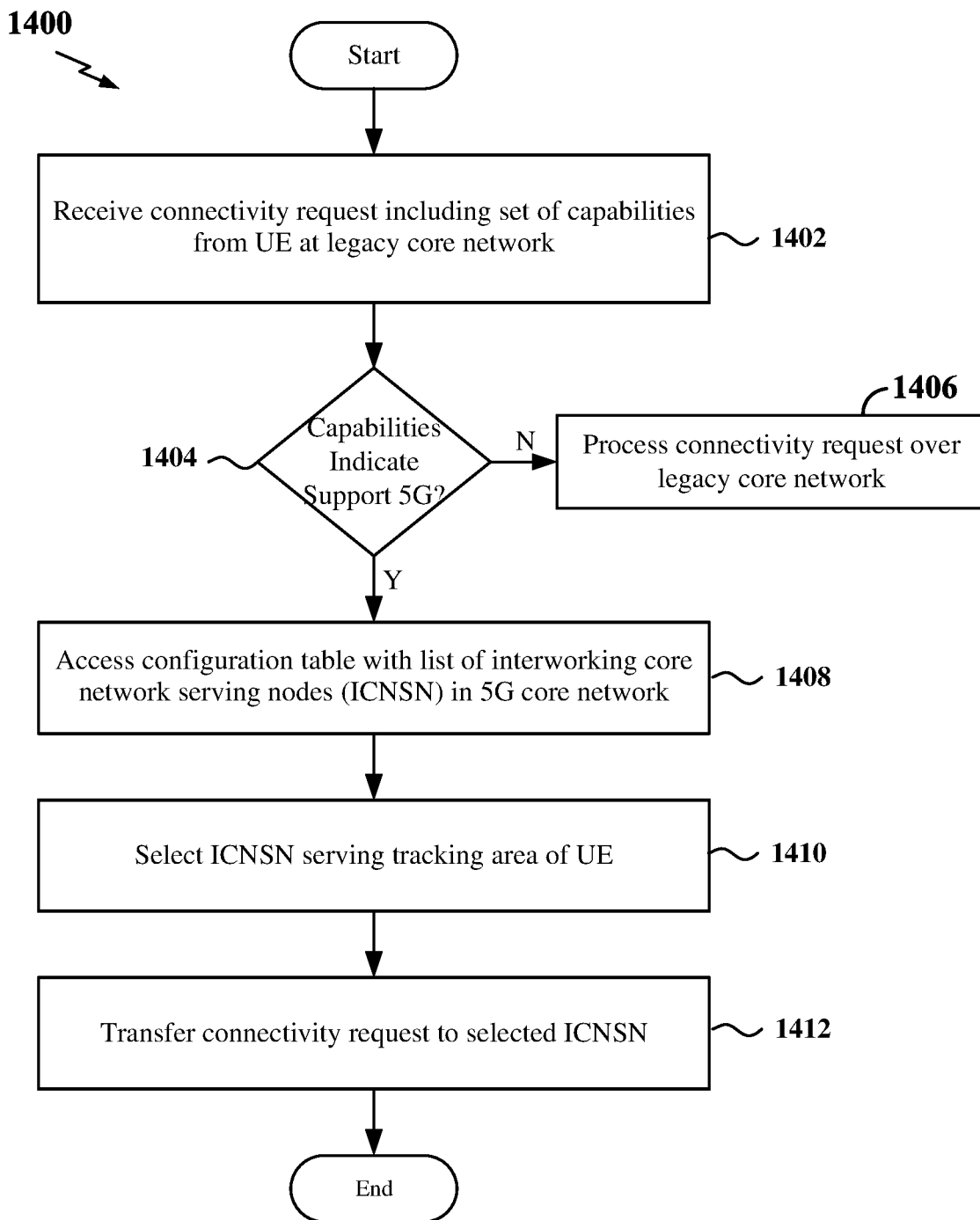
FIG. 14 is a flow chart of another method for interworking between core networks in a communication network.

FIG. 14 is a flow chart 1400 of a method for interworking between core networks in a communication network. As described below, some or all illustrated features may be omitted in a particular implementation within the scope of the present disclosure, and some illustrated features may not be required for implementation of all embodiments. In some examples, the method may be performed by a legacy core network serving node, such as a MME, as described above and illustrated in FIG. 11, by a processor or processing system, or by any suitable means for carrying out the described functions.

At block 1402, the legacy core network serving node receives a connectivity request from a UE via a legacy wireless access network (AN) utilizing a legacy RAT. For example, the MME in the legacy core network may receive a non-access stratum (NAS) message including a set of capabilities of the UE. The set of capabilities may include, for example, an indication of whether the UE supports legacy and/or next generation RATs and an indication of whether the UE supports an inter-RAT handover (i.e., between legacy and next generation ANs) initiated by the UE.

At block 1404, the legacy core network serving node (e.g., MME) may determine whether the UE supports a second RAT. For example, the MME may determine whether the UE supports a next generation RAT based on the set of capabilities of the UE and/or a user profile/subscription. If the UE does not support a next generation RAT (N branch of block 1404), at block 1406, the MME processes the connectivity request over the legacy core network. For example, the MME may authenticate the UE, establish a Packet Data Network (PDN) connection between the UE and a PDN Gateway via the legacy AN, and select one or more QoS parameters for the PDN connection.

If the UE does support a next generation RAT (Y branch of block 1404), at block 1408, the MME may access a configuration table with a list of interworking core network serving nodes (e.g., eMMEs). At block 1410, the MME may select the eMME serving the current tracking area of the UE from the configuration table, and at block 1412, transfer the connectivity request to the selected eMME. For example, the MME may forward the connectivity request to the selected eMME or redirect the connectivity request to the selected eMME via the legacy AN and an interworking serving gateway (eSGW).

Figure 15:
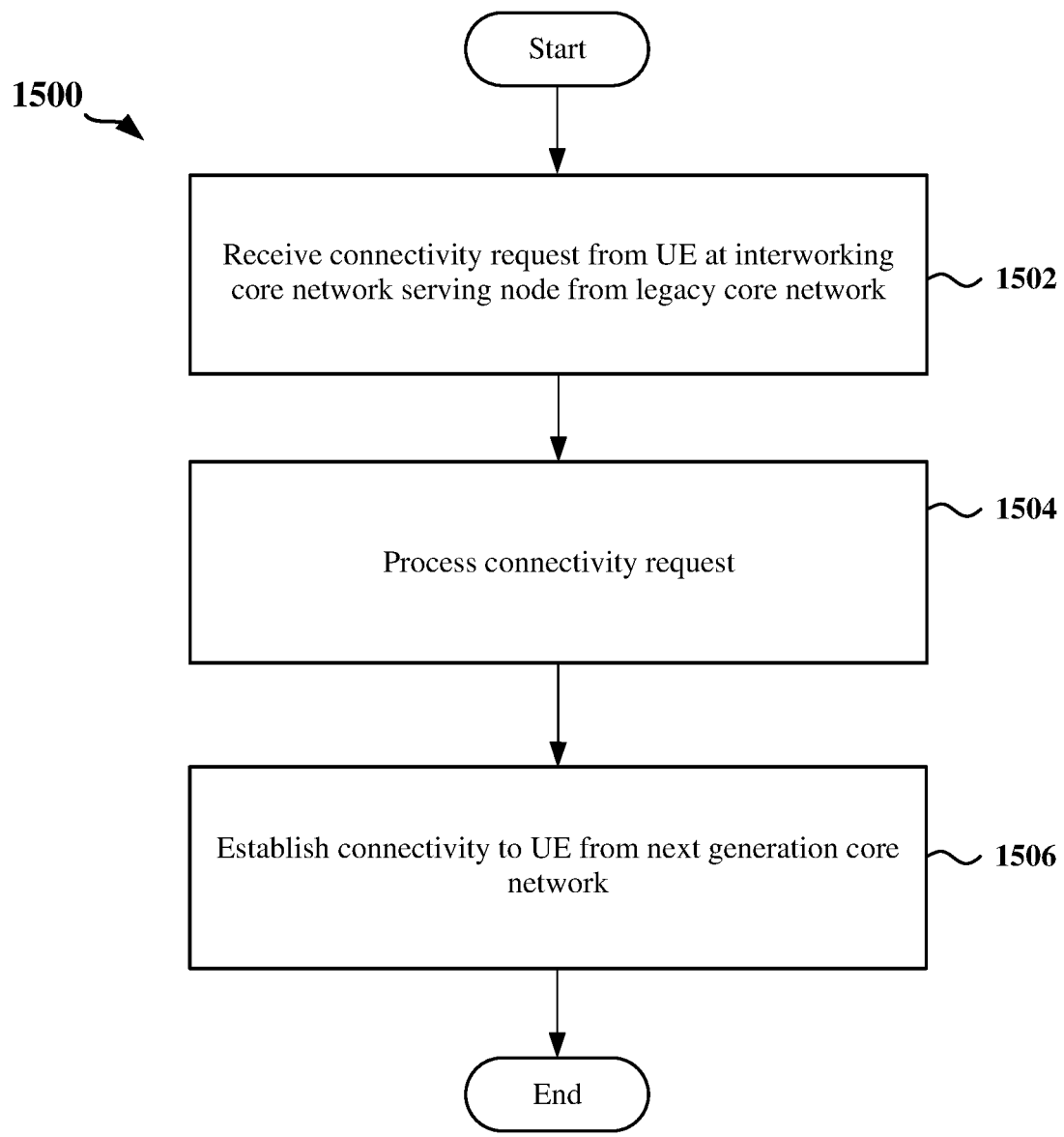
FIG. 15 is a flow chart of another method for interworking between core networks in a communication network.

FIG. 15 is a flow chart 1500 of a method for interworking between core networks in a communication network. As described below, some or all illustrated features may be omitted in a particular implementation within the scope of the present disclosure, and some illustrated features may not be required for implementation of all embodiments. In some examples, the method may be performed by an interworking core network serving node, such as an eMME, as described above and illustrated in FIG. 11, by a processor or processing system, or by any suitable means for carrying out the described functions.

At block 1502, the interworking core network serving node (e.g., eMME) within a next generation core network may receive a redirected connectivity request from a UE in wireless communication with a base station within a legacy wireless access network that utilizes a legacy RAT. The connectivity request may have been originated by the UE towards a legacy core network and redirected to the eMME via, for example, an interworking serving gateway (eSGW). The connectivity request may include, for example, a set of capabilities of the UE. The set of capabilities may include, for example, an indication of whether the UE supports legacy and/or next generation RATs and an indication of whether the UE supports an inter-RAT handover (i.e., between legacy and next generation ANs) initiated by the UE.

At block 1504, the eMME may process the connectivity request based on at least an indication that the UE supports the next generation RAT. For example, the eMME may authenticate the UE or may select another next generation core network serving node (e.g., CP-MM/CP-SM) within the next generation network to authenticate the UE. At block 1506, the eMME may establish connectivity to the UE upon successfully processing the connectivity request. The eMME may then provide an indication to the UE of whether the next generation core network supports UE-initiated inter-RAT handovers In addition, the eMME may further select a quality of service (QoS) to associate with the connectivity to the UE. The QoS may include, for example, both legacy and next generation QoS parameters.

Figure 16:
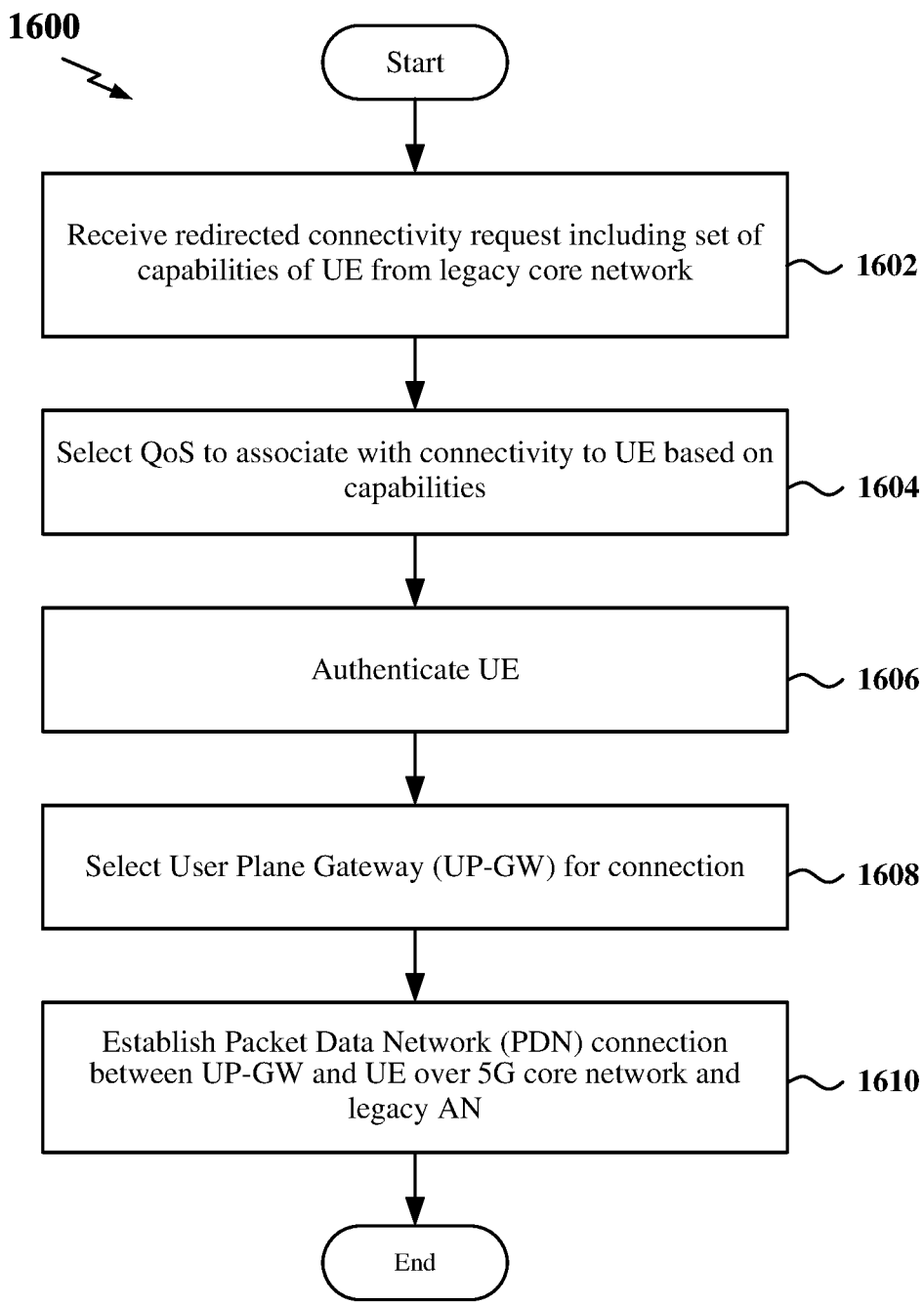
FIG. 16 is a flow chart of another method for interworking between core networks in a communication network.

FIG. 16 is a flow chart 1600 of a method for interworking between core networks in a communication network. As described below, some or all illustrated features may be omitted in a particular implementation within the scope of the present disclosure, and some illustrated features may not be required for implementation of all embodiments. In some examples, the method may be performed by an interworking core network serving node, such as an eMME, as described above and illustrated in FIG. 11, by a processor or processing system, or by any suitable means for carrying out the described functions.

At block 1602, the interworking core network serving node (e.g., eMME) may receive a redirected connectivity request from a UE in wireless communication with a base station within a legacy wireless access network that utilizes a legacy RAT. The connectivity request may have been originated by the UE towards a legacy core network and redirected to the eMME via, for example, an interworking serving gateway (eSGW). The connectivity request may include, for example, a set of capabilities of the UE. The set of capabilities may include, for example, an indication of whether the UE supports legacy and/or next generation RATs and an indication of whether the UE supports an inter-RAT handover (i.e., between legacy and next generation ANs) initiated by the UE.

At block 1604, the eMME may select one or more Quality of Service (QoS) parameters to associate with the connectivity to the UE based on the set of capabilities. The QoS parameters may include, for example, both legacy and next generation QoS parameters. At block 1606, the eMME may authenticate the UE based on at least the set of capabilities. In some examples, the UE may establish an enhanced mobile management (EMM) context with the eMME and authenticates with the eMME using legacy mechanisms. For example, the eMME may interact with an Authentication, Authorization and Accounting (AAA) server/HSS to retrieve the subscriber profile for the UE and perform authentication and key derivation to secure the radio link.

At block 1608, the eMME may select a User Plane Gateway (UP-GW) for the connection, and at block 1610, establish a Packet Data Network (PDN) connection between the UE and the UP-GW over the next generation core network and the legacy AN. For example, the eMME may select the UP-GW having a connection to a destination external data network for the PDN connection and establish the PDN connection between the UE and UP-GW via an interworking gateway (e.g., an evolved serving gateway).

Figure 17:
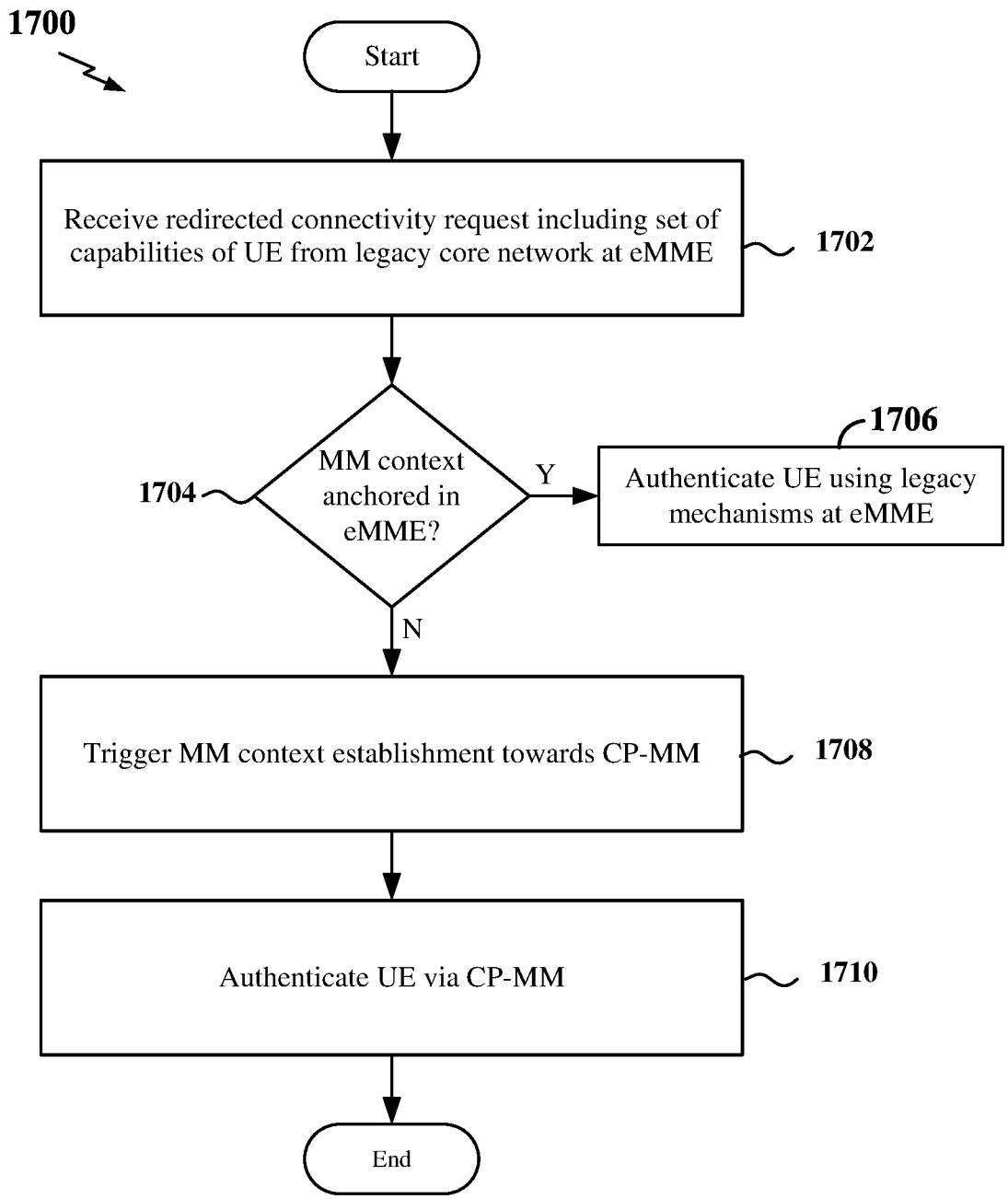
FIG. 17 is a flow chart of another method for interworking between core networks in a communication network.

FIG. 17 is a flow chart 1700 of a method for interworking between core networks to authenticate a UE in a communication network. As described below, some or all illustrated features may be omitted in a particular implementation within the scope of the present disclosure, and some illustrated features may not be required for implementation of all embodiments. In some examples, the method may be performed by an interworking core network serving node, such as an eMME, as described above and illustrated in FIG. 11, by a processor or processing system, or by any suitable means for carrying out the described functions.

At block 1702, the interworking core network serving node (e.g., eMME) may receive a redirected connectivity request from a UE in wireless communication with a base station within a legacy wireless access network that utilizes a legacy RAT. The connectivity request may have been originated by the UE towards a legacy core network and redirected to the eMME via, for example, an interworking serving gateway (eSGW). The connectivity request may include, for example, a set of capabilities of the UE. The set of capabilities may include, for example, an indication of whether the UE supports legacy and/or next generation RATs and an indication of whether the UE supports an inter-RAT handover (i.e., between legacy and next generation ANs) initiated by the UE.

At block 1704, the eMME may determine whether the mobility management (MM) context is anchored in the eMME. If the MM context is anchored in the eMME (Y branch of 1704), at block 1706, the eMME may authenticate the UE using legacy mechanisms. For example, the eMME may interact with an Authentication, Authorization and Accounting (AAA) server/HSS (not shown) to retrieve the subscriber profile for the UE and perform authentication and key derivation to secure the radio link.

If the MM context is not anchored in the eMME (N branch of 1704), at 1708, the eMME may trigger MM context establishment towards the CP-MM. For example, the eMME may select a serving CP-MM based on preconfigured information (e.g., based on the location of the serving legacy cell), and trigger an MM context establishment towards the selected CP-MM. At block 1710, the eMME may authenticate the UE via the CP-MM. For example, the CP-MM may interact with the AAA/HSS to retrieve the subscriber profile and perform the authentication and key derivation to secure the radio link.

Figure 18:
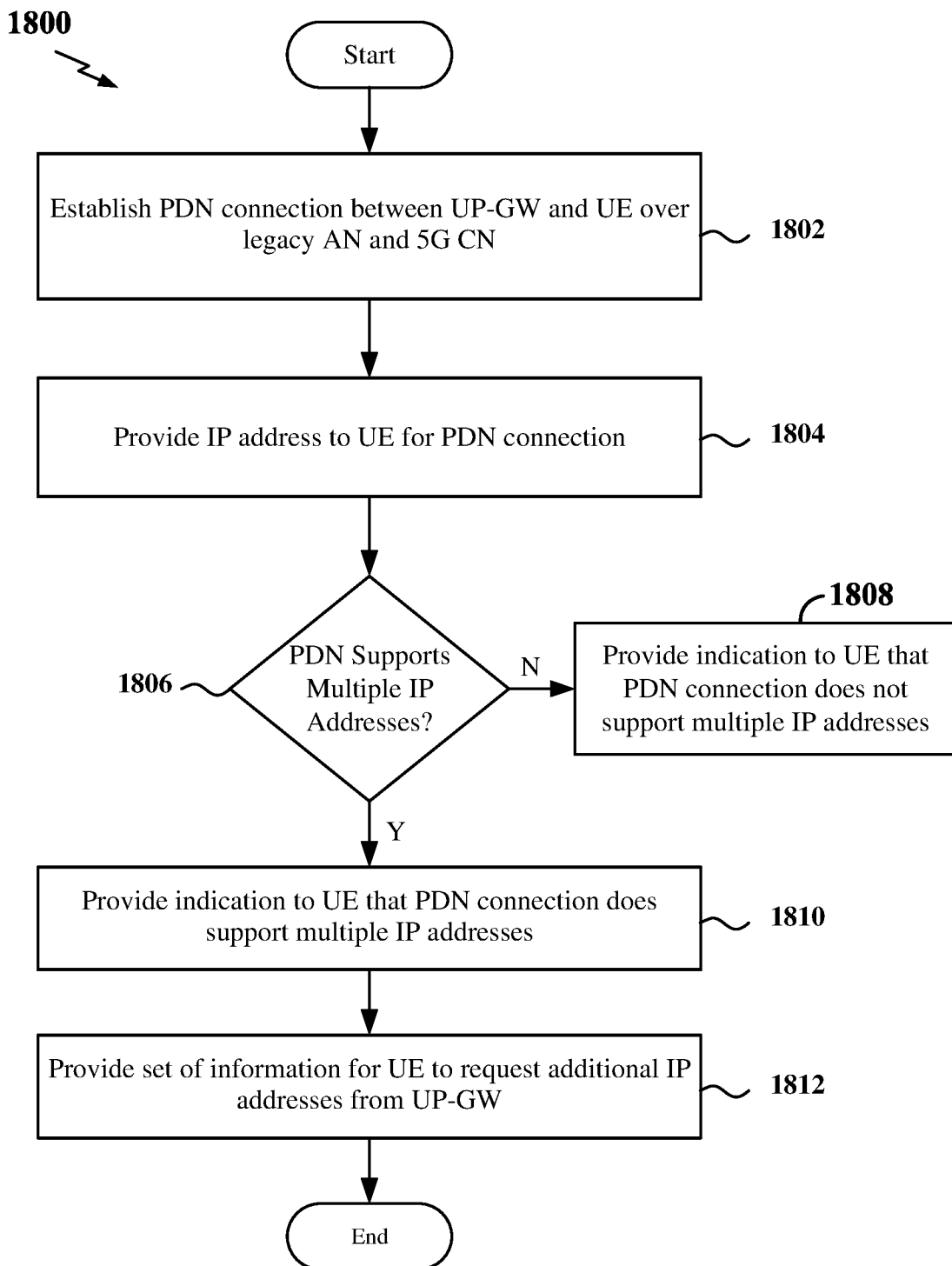
FIG. 18 is a flow chart of another method for interworking between core networks in a communication network.

FIG. 18 is a flow chart 1800 of a method for interworking between core networks to provide multiple data connection (e.g., IP) addresses in a communication network. As described below, some or all illustrated features may be omitted in a particular implementation within the scope of the present disclosure, and some illustrated features may not be required for implementation of all embodiments. In some examples, the method may be performed by an interworking core network serving node, such as an eMME, as described above and illustrated in FIG. 11, by a processor or processing system, or by any suitable means for carrying out the described functions.

At block 1802, the interworking core network serving node (e.g., eMME) may establish a Packet Data Network (PDN) connection between a UE and a selected UP-GW over the next generation core network and a legacy AN serving the UE. For example, the eMME may select the UP-GW having a connection to a destination external data network for the PDN connection and establish the PDN connection between the UE and UP-GW via an interworking gateway (e.g., an evolved serving gateway). At block 1804, the eMME may provide an IP address to the UE assigned to the UE by the UP-GW for the PDN connection.

At block 1806, the eMME may determine whether the PDN connection supports multiple IP addresses. If the PDN connection does not support multiple IP addresses (N branch of block 1806), at block 1808, the eMME may provide an indication to the UE that the PDN connection does not support multiple IP addresses. If the PDN connection does support multiple IP addresses (Y branch of block 1808), at block 1810, the eMME may provide an indication to the UE that the PDN connection supports multiple IP addresses. At block 1812, the eMME may then provide a set of information to be used by the UE to request additional IP addresses. The set of information may include, for example, an address corresponding to the serving UP-GW that enables the UE to request additional IP addresses from the UP-GW.

Figure 19:
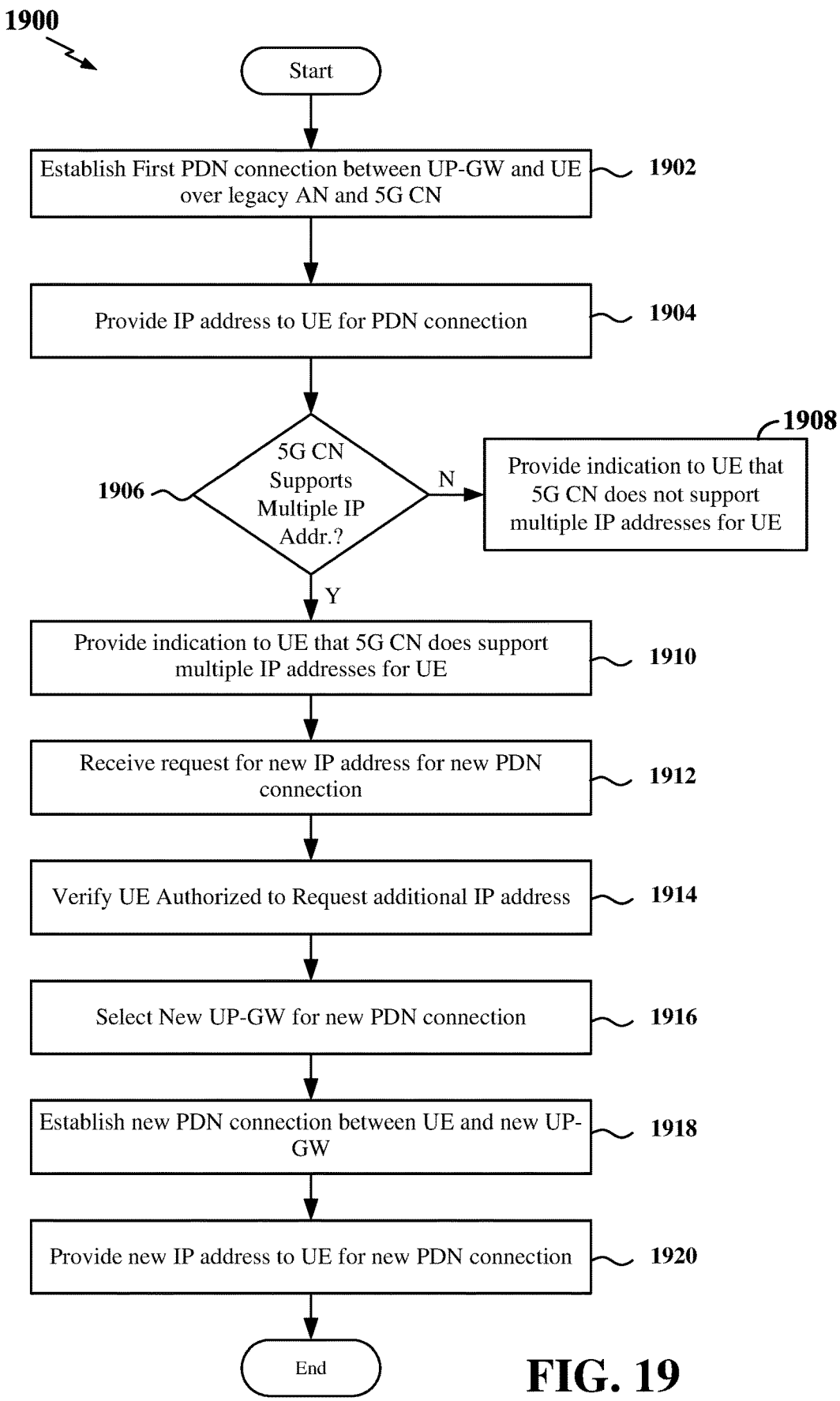
FIG. 19 is a flow chart of another method for interworking between core networks in a communication network.

FIG. 19 is a flow chart 1900 of a method for interworking between core networks to provide multiple data connection (e.g., IP) addresses in a communication network. As described below, some or all illustrated features may be omitted in a particular implementation within the scope of the present disclosure, and some illustrated features may not be required for implementation of all embodiments. In some examples, the method may be performed by an interworking core network serving node, such as an eMME, as described above and illustrated in FIG. 11, by a processor or processing system, or by any suitable means for carrying out the described functions.

At block 1902, the interworking core network serving node (e.g., eMME) may establish a first Packet Data Network (PDN) connection between a UE and a selected UP-GW over the next generation core network and a legacy AN serving the UE. For example, the eMME may select the UP-GW having a connection to a destination external data network for the first PDN connection and establish the first PDN connection between the UE and UP-GW via an interworking gateway (e.g., an evolved serving gateway). At block 1904, the eMME may provide an IP address to the UE assigned to the UE by the UP-GW for the first PDN connection.

At block 1906, the eMME may determine whether the next generation core network supports multiple IP addresses for the UE through the legacy AN. If the next generation core network does not support multiple IP addresses (N branch of block 1906), at block 1908, the eMME may provide an indication to the UE that the next generation core network does not support multiple IP addresses for the UE through the legacy AN. If the next generation core network does support multiple IP addresses (Y branch of block 1908), at block 1910, the eMME may provide an indication to the UE that the next generation core network supports multiple IP addresses for the UE.

At block 1912, the eMME may then receive a request from the UE for a new IP address for a new PDN connection. For example, the eMME may receive an enhanced NAS signal from the UE requesting a new IP addresses and providing the connectivity requirements for the new IP address/PDN connection (e.g., the type of session continuity required). At block 1914, the eMME may then verify that the UE is authorized to request a new IP address and process the information provided by the UE. At block 1916, the eMME may then select a new UP-GW for the new PDN connection, which assigns the new IP address, and at block 1918, establish the new PDN connection between the UE and the new UP-GW over the next generation core network and the legacy AN. At block 1920, the eMME may then return the new IP address to the UE.

Figure 20:
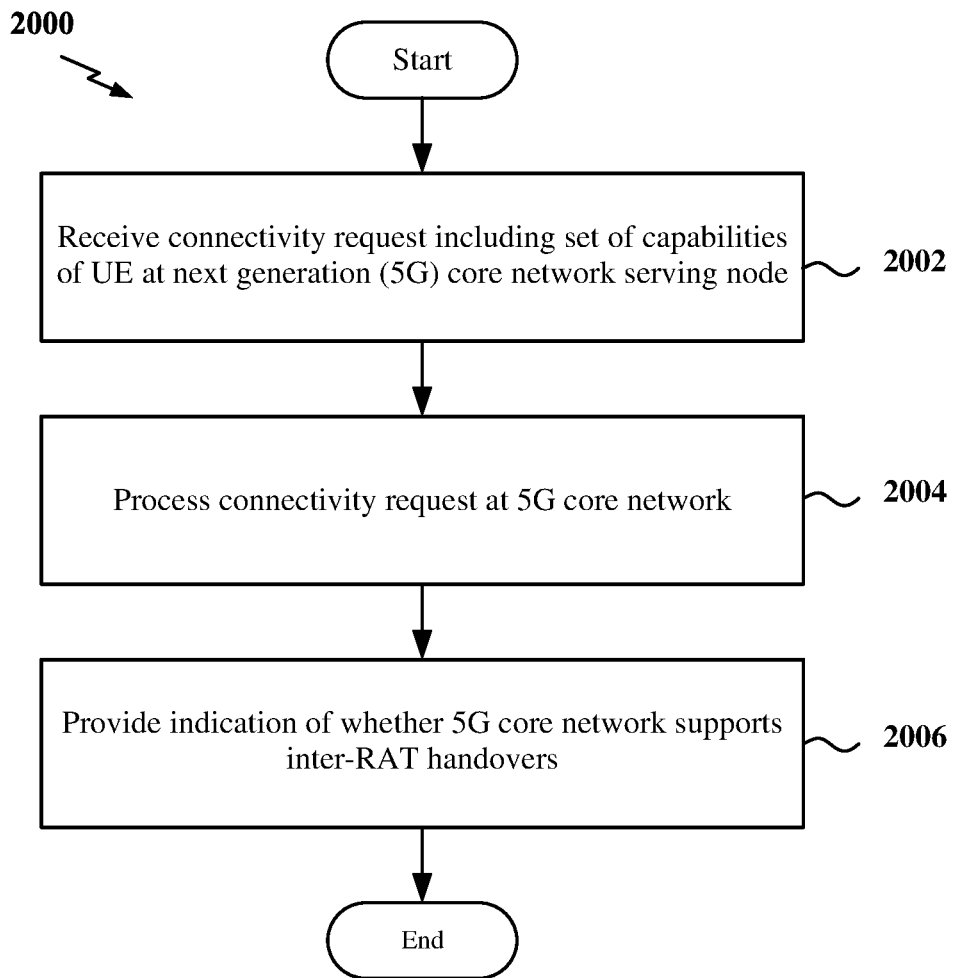
FIG. 20 is a flow chart of another method for establishing connectivity to a next generation communication network.

FIG. 20 is a flow chart 2000 of a method for establishing connectivity to a next generation communication network. As described below, some or all illustrated features may be omitted in a particular implementation within the scope of the present disclosure, and some illustrated features may not be required for implementation of all embodiments. In some examples, the method may be performed by a next generation core network serving node, such as a CP-MM and/or CP-SM, as described above and illustrated in FIG. 11, by a processor or processing system, or by any suitable means for carrying out the described functions.

At block 2002, the next generation core network serving node within a next generation core network may receive a connectivity request from a UE in wireless communication with a base station within a next generation wireless access network that utilizes a next generation RAT. The connectivity request may include, for example, a set of capabilities of the UE. The set of capabilities may include, for example, an indication of whether the UE supports legacy and/or next generation RATs and an indication of whether the UE supports an inter-RAT handover (i.e., between legacy and next generation ANs) initiated by the UE.

At block 2004, the next generation core network serving node may process the connectivity request at the next generation core network. For example, the next generation core network serving node may establish a data network session (DNS) connection between the UE and an external data network over the next generation AN via the next generation core network. At block 2006, the next generation core network serving node may then provide an indication to the UE of whether the next generation core network supports an inter-RAT handover. For example, the next generation core network serving node may indicate whether the next generation core network supports inter-RAT handovers initiated by the UE or whether the UE is allowed to perform inter-RAT handovers.

Figure 21:
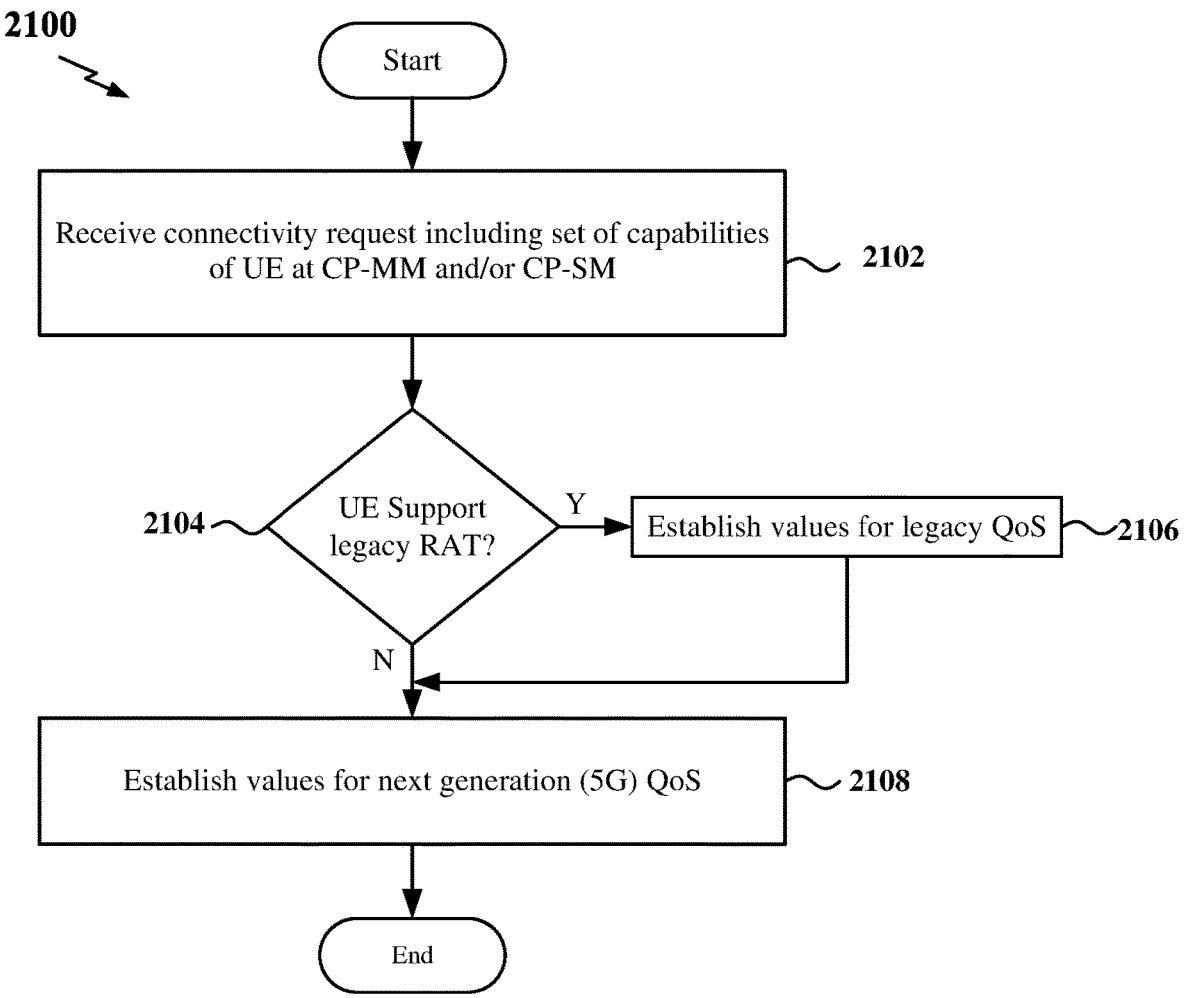
FIG. 21 is a flow chart of another method for establishing connectivity to a next generation communication network.

FIG. 21 is a flow chart 2100 of a method for establishing connectivity to a next generation communication network. As described below, some or all illustrated features may be omitted in a particular implementation within the scope of the present disclosure, and some illustrated features may not be required for implementation of all embodiments. In some examples, the method may be performed by a next generation core network serving node, such as a CP-MM and/or CP-SM, as described above and illustrated in FIG. 11, by a processor or processing system, or by any suitable means for carrying out the described functions.

At block 2102, the next generation core network serving node within a next generation core network may receive a connectivity request from a UE in wireless communication with a base station within a next generation wireless access network that utilizes a next generation RAT. The connectivity request may include, for example, a set of capabilities of the UE. The set of capabilities may include, for example, an indication of whether the UE supports legacy and/or next generation RATs and an indication of whether the UE supports an inter-RAT handover (i.e., between legacy and next generation ANs) initiated by the UE.

At block 2104, the next generation core network serving node may determine whether the UE supports connectivity to a legacy RAT based on the set of capabilities. If the UE does support connectivity to a legacy RAT (Y branch of 2104), at block 2106, the next generation core network serving node may establish values for one or more legacy QoS parameters. In some examples, the set of capabilities may include at least a portion of the legacy QoS parameters for the UE. In other examples, the core network serving node may retrieve or derive one or more of the legacy QoS parameters from a UE profile, network policies and/or other factors.

If the UE does not support connectivity to a legacy RAT (N branch of 2104) or after establishing legacy QoS parameters at block 2106, at block 2108, the next generation core network serving node may establish values for one or more next generation QoS parameters. For example, the next generation core network serving node may use one or more of the set of capabilities, UE profile, network policies and other factors to select the next generation QoS parameters and establish values for the next generation QoS parameters.

Figure 22:
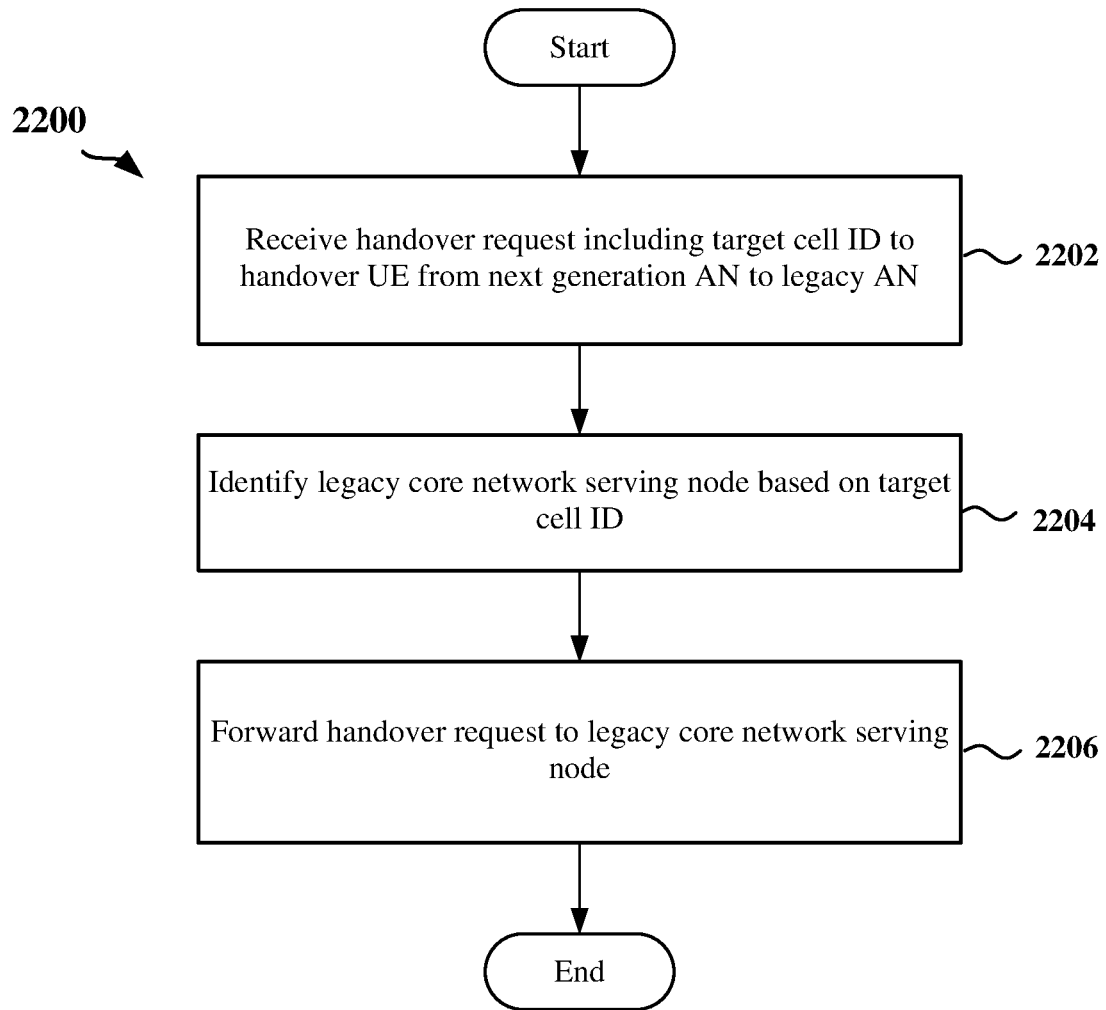
FIG. 22 is a flow chart of a method for performing a handover between core networks in a communication network.

FIG. 22 is a flow chart 2200 of a method for performing a handover between core networks in a communication network. As described below, some or all illustrated features may be omitted in a particular implementation within the scope of the present disclosure, and some illustrated features may not be required for implementation of all embodiments. In some examples, the method may be performed by a next generation core network serving node, such as an eMME, CP-MM and/or CP-SM, as described above and illustrated in FIG. 11, by a processor or processing system, or by any suitable means for carrying out the described functions.

At block 2202, the next generation core network serving node may receive a handover request for handing over a UE from a next generation wireless access network (next generation AN) utilizing a next generation RAT to a legacy wireless access network (legacy AN) utilizing a legacy RAT. The handover request may include an identifier of a target cell within the legacy AN. In some examples, a CP-MM and/or CP-SM may receive the handover request from the next generation AN. The handover request may include an identity of an eMME for handling the handover request or the CP-MM and/or CP-SM may determine the identity of the eMME based on the target cell ID. The CP-MM and/or CP-SM may then forward the handover request to the eMME. In other examples, the eMME receives the handover request (e.g., from the CP-MM and/or CP-SM or the next generation AN).

At block 2204, the next generation core network serving node (e.g., eMME) may identify a legacy core network serving node (e.g., MME) based on the target cell ID. At block 2206, the next generation core network serving node (e.g., eMME) may then forward the handover request to the legacy core network serving node (e.g., MME) to complete the handover.

Figure 23:
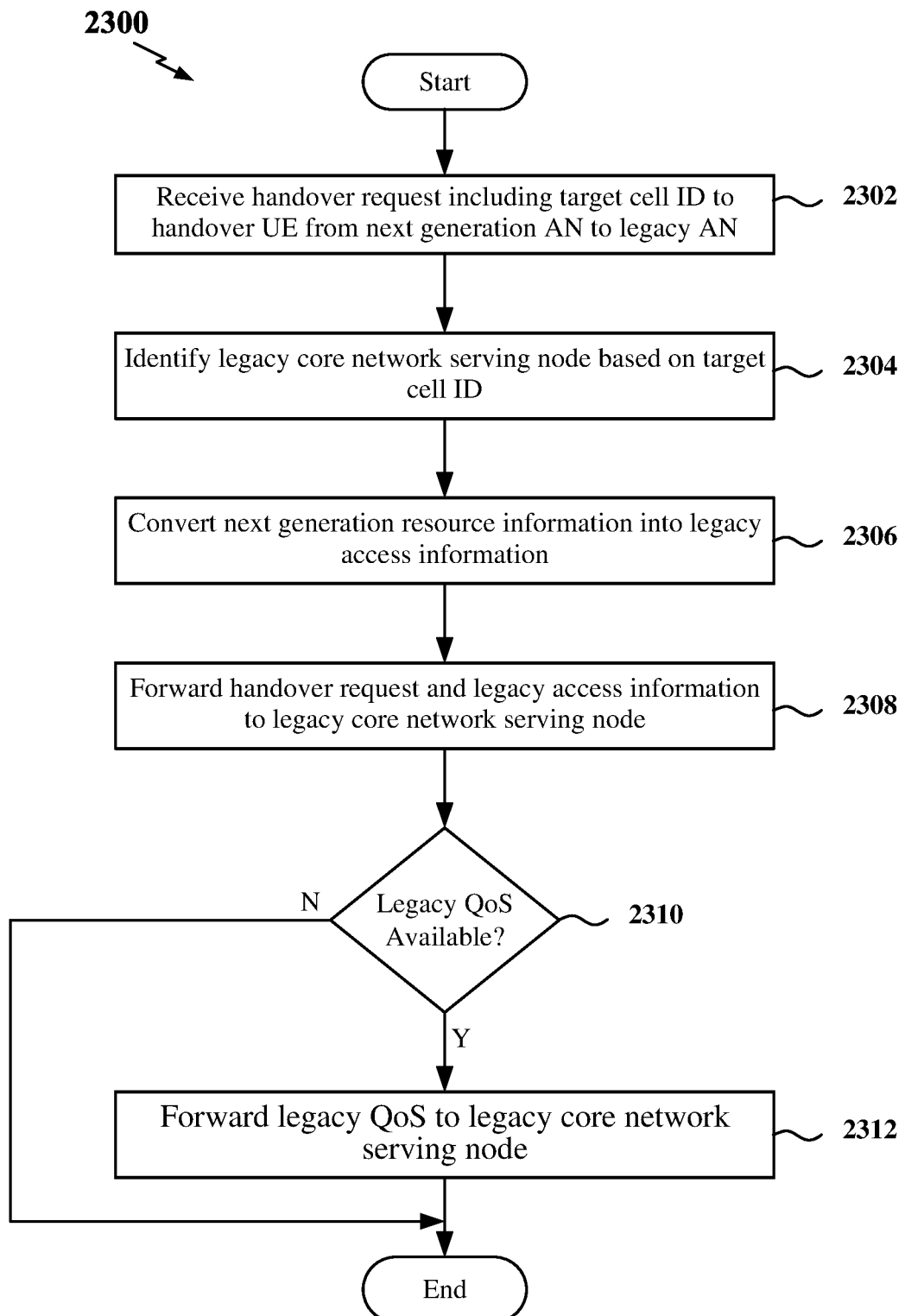
FIG. 23 is a flow chart of another method for performing a handover between core networks in a communication network.

FIG. 23 is a flow chart 2300 of a method for performing a handover between core networks in a communication network. As described below, some or all illustrated features may be omitted in a particular implementation within the scope of the present disclosure, and some illustrated features may not be required for implementation of all embodiments. In some examples, the method may be performed by an interworking core network serving node, such as an eMME, as described above and illustrated in FIG. 11, by a processor or processing system, or by any suitable means for carrying out the described functions.

At block 2302, the eMME may receive a handover request for handing over a UE from a next generation wireless access network (next generation AN) utilizing a next generation RAT to a legacy wireless access network (legacy AN) utilizing a legacy RAT. The handover request may include an identifier of a target cell within the legacy AN. In some examples, a CP-MM and/or CP-SM may receive the handover request from the next generation AN. The handover request may include an identity of an eMME for handling the handover request or the CP-MM and/or CP-SM may determine the identity of the eMME based on the target cell ID. The CP-MM and/or CP-SM may then forward the handover request to the eMME.

At block 2304, the eMME may identify a legacy core network serving node (e.g., MME) based on the target cell ID. At block 2306, the eMME may convert next generation resource information (e.g., radio bearer configuration, security information, etc.) into legacy access information. At block 2308, the eMME may then forward the handover request and legacy access information to the MME. At block 2310, the eMME may further determine whether legacy QoS information is available. For example, legacy QoS information may be established when the QoS was originally established in the next generation AN. If legacy QoS information is available (Y branch of block 2310), at block 2312, the eMME may further forward the legacy QoS information to the MME.

Figure 24:
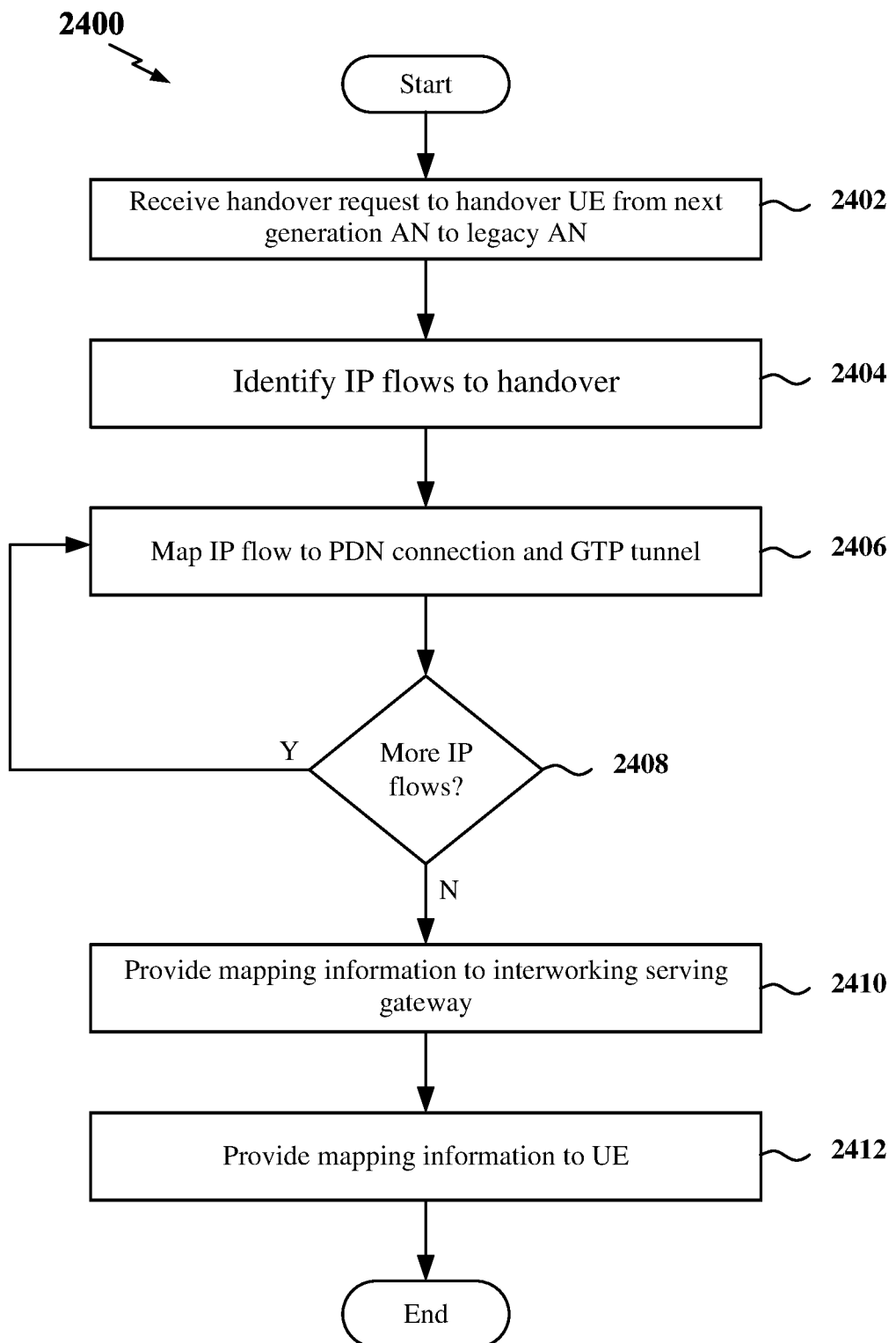
FIG. 24 is a flow chart of another method for performing a handover between core networks in a communication network.

FIG. 24 is a flow chart 2400 of a method for performing a handover between core networks in a communication network. As described below, some or all illustrated features may be omitted in a particular implementation within the scope of the present disclosure, and some illustrated features may not be required for implementation of all embodiments. In some examples, the method may be performed by an interworking core network serving node, such as an eMME, as described above and illustrated in FIG. 11, by a processor or processing system, or by any suitable means for carrying out the described functions.

At block 2402, the eMME may receive a handover request for handing over a UE from a next generation wireless access network (next generation AN) utilizing a next generation RAT to a legacy wireless access network (legacy AN) utilizing a legacy RAT. In some examples, a CP-MM and/or CP-SM may receive the handover request from the next generation AN. The handover request may include an identity of an eMME for handling the handover request or the CP-MM and/or CP-SM may determine the identity of the eMME based on the target cell ID. The CP-MM and/or CP-SM may then forward the handover request to the eMME.

At block 2404, the eMME may identify IP flows to be handed over from the next generation AN to the legacy AN network. At block 2406, the eMME may map an IP flow to a Packet Data Network (PDN) connection and a Generic Tunneling Protocol (GTP) tunnel within the PDN connection for communicating over the legacy AN. For example, the eMME may map each IP flow to a PDN connection based on at least the external data network associated with the IP flow. In some examples, the characteristics of the IP flows (e.g., QoS, packet processing requirements, etc.) may further be used to map IP flows to PDN connections.

At block 2408, the eMME determines whether there are additional IP flows involved in the handover. If there are additional IP flows (Y branch of 2408), at block 2406, the eMME maps another IP flow to PDN connection and a GTP tunnel within the PDN connection for communicating over the legacy AN. If there are no additional IP flows (N branch of 2408), at block 2410, the eMME provides mapping information indicating the mapping of IP flows to PDN connections and GTP tunnels to an interworking serving gateway within the next generation core network. At block 2412, the eMME further provides the mapping information to the UE for use by the UE in encapsulating IP flow PDUs into PDN PDUs.

Figure 25:
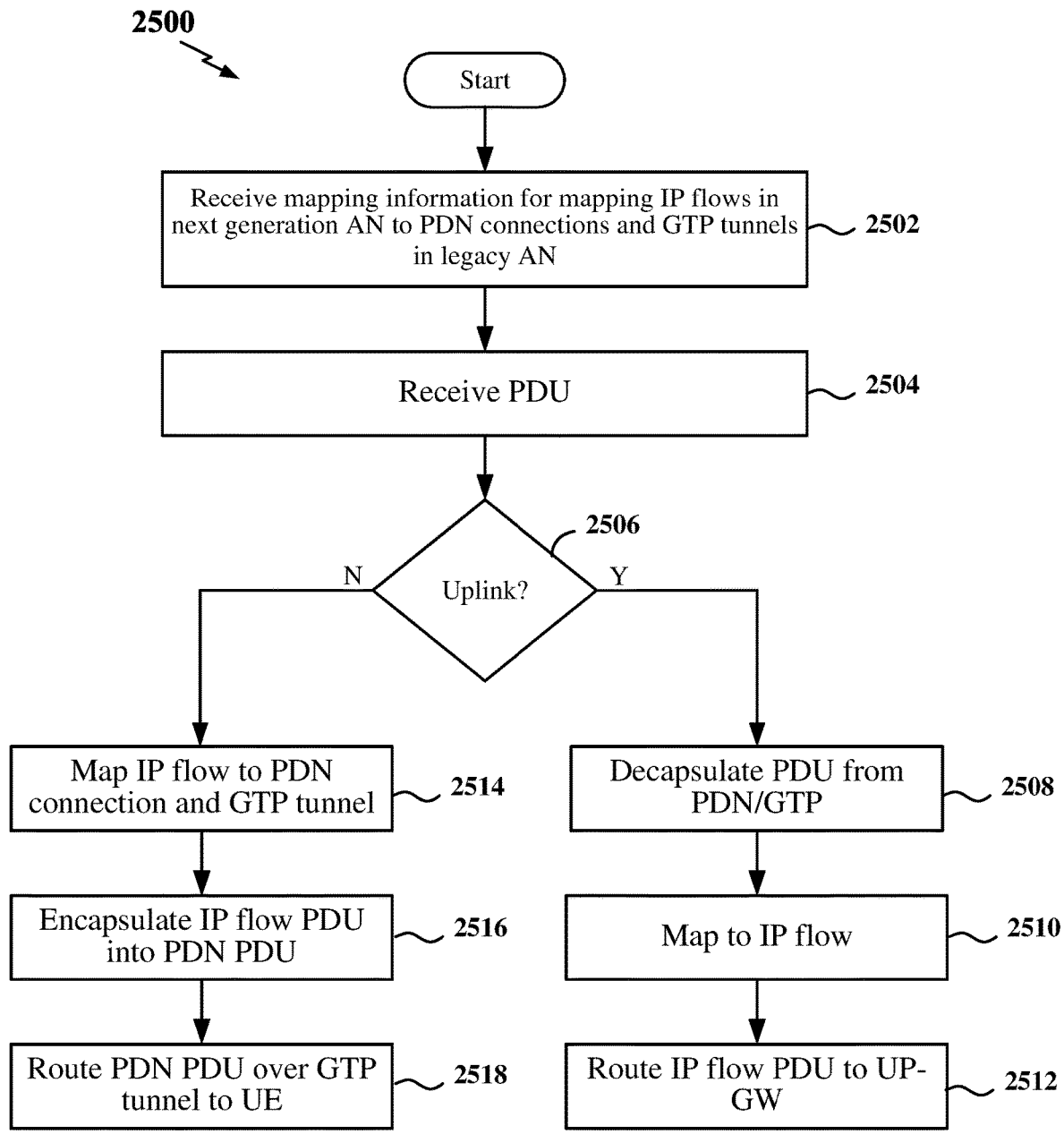
FIG. 25 is a flow chart of a method for routing IP flows after performing a handover between core networks in a communication network.

FIG. 25 is a flow chart 2500 of a method for routing IP flows after performing a handover between core networks in a communication network. As described below, some or all illustrated features may be omitted in a particular implementation within the scope of the present disclosure, and some illustrated features may not be required for implementation of all embodiments. In some examples, the method may be performed by an interworking core network serving node, such as an eSGW, as described above and illustrated in FIG. 11, by a processor or processing system, or by any suitable means for carrying out the described functions.

At block 2502, the eSGW may receive mapping information indicating the mapping of next generation IP flows to legacy PDN connections and GTP tunnels after a handover from a next generation RAT to a legacy RAT has been performed. At block 2504, the eSGW may further receive a PDU for routing. At block 2506, the eSGW determines whether the PDU is an uplink PDU or a downlink PDU. If the PDU is an uplink PDU (Y branch of block 2506), at blocks 2508 and 2510, the eSGW decapsulates the IP flow PDU from the PDN PDU and maps the IP flow PDU to the correct IP flow based on the mapping information. For example, the eSGW may identify the correct IP flow based on the IP addresses (UE and UP-GW) in the IP flow PDU. At block 2512, the eSGW may route the IP flow PDU to the UP-GW associated with the IP flow.

If the PDU is not a downlink PDU (N branch of block 2506), at block 2514, the eSGW maps the IP flow to the PDN connection and GTP tunnel based on the mapping information. For example, the eSGW may identify the PDN connection and GTP tunnel based on the IP addresses (UE and UP-GW) in the IP flow PDU. At block 2516, the eSGW may encapsulate the IP flow PDU into a PDN PDU for the PDN connection and GTP tunnel. At 2518, the eSGW may route the PDN PDU over the GTP tunnel within the PDN connection to the UE.

Figure 26:
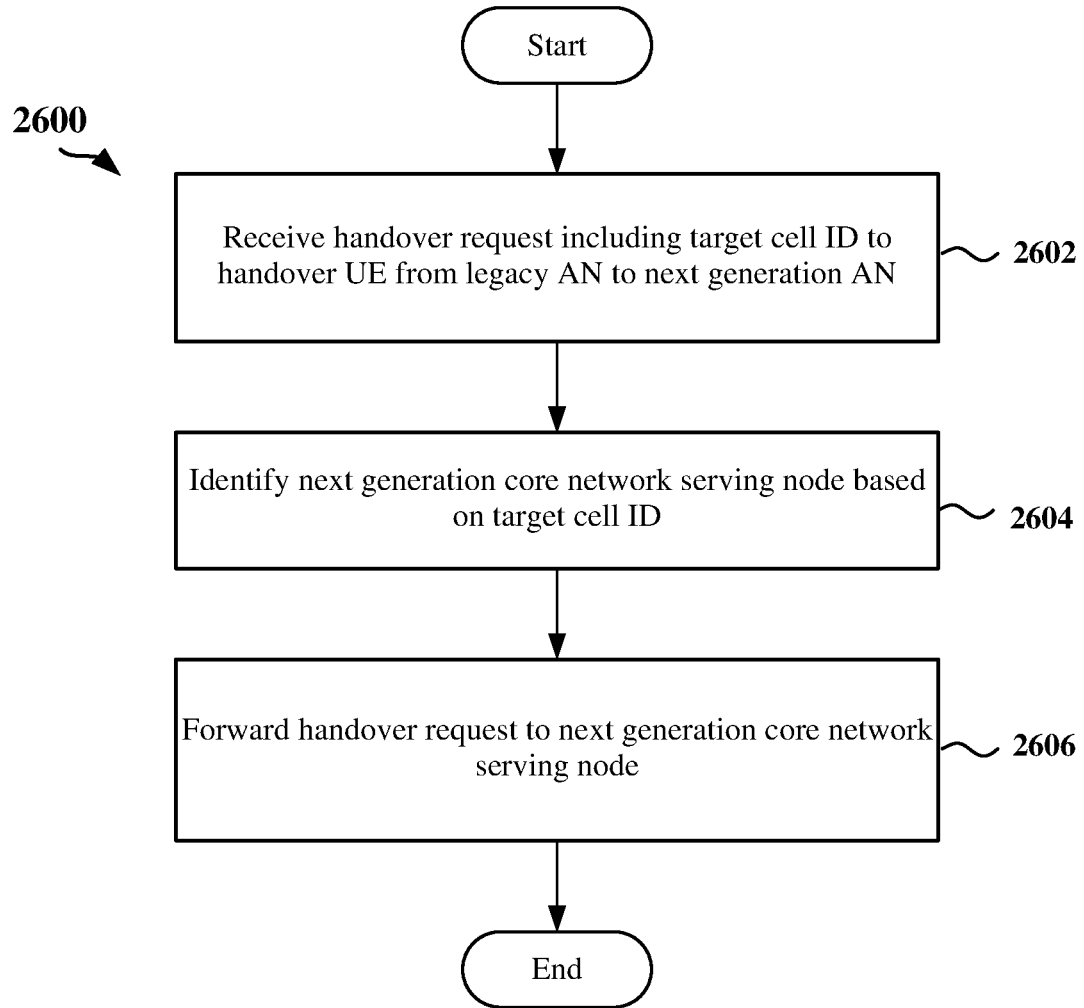
FIG. 26 is a flow chart of another method for performing a handover between core networks in a communication network.

FIG. 26 is a flow chart 2600 of a method for performing a handover between core networks in a communication network. As described below, some or all illustrated features may be omitted in a particular implementation within the scope of the present disclosure, and some illustrated features may not be required for implementation of all embodiments. In some examples, the method may be performed by an interworking core network serving node, such as an eMME, as described above and illustrated in FIG. 11, by a processor or processing system, or by any suitable means for carrying out the described functions.

At block 2602, the eMME may receive a handover request for handing over a UE from a legacy wireless access network (legacy AN) utilizing a legacy RAT to a next generation wireless access network (next generation AN) utilizing a next generation RAT. The handover request may include an identifier of a target cell within the next generation AN. For example, the eMME may receive the handover request from an eNB within the legacy AN or an MME within a legacy core network.

At block 2604, the eMME may identify a next generation core network serving node (e.g., CP-MM and/or CP-SM) based on the target cell ID. At block 2606, the next generation core network serving node (e.g., eMME) may then forward the handover request to the CP-MM and/or CP-SM to complete the handover.

Figure 27:
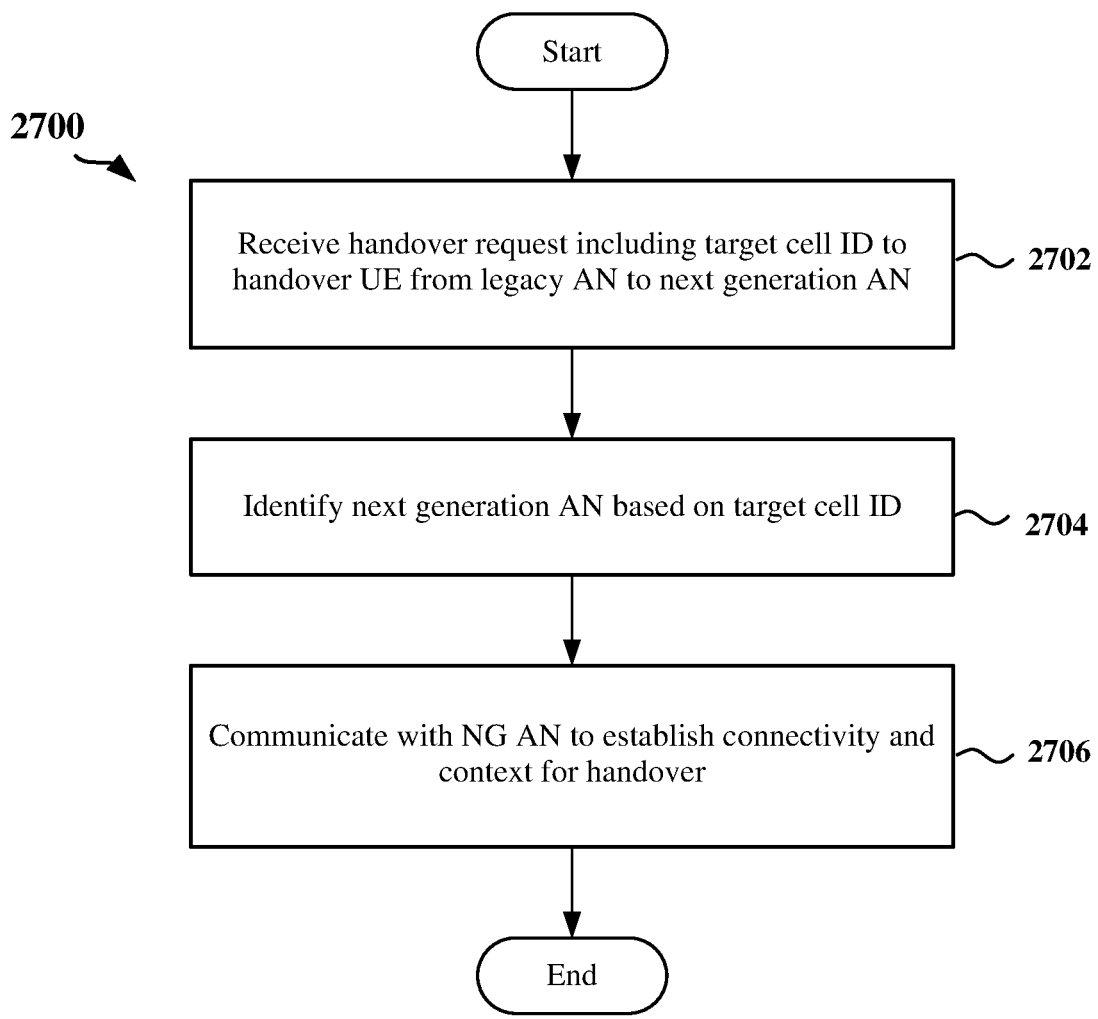
FIG. 27 is a flow chart of another method for performing a handover between core networks in a communication network.

FIG. 27 is a flow chart 2700 of a method for performing a handover between core networks in a communication network. As described below, some or all illustrated features may be omitted in a particular implementation within the scope of the present disclosure, and some illustrated features may not be required for implementation of all embodiments. In some examples, the method may be performed by a next generation core network serving node, such as a CP-MM and/or CP-SM, as described above and illustrated in FIG. 11, by a processor or processing system, or by any suitable means for carrying out the described functions.

At block 2702, the next generation core network serving node may receive a handover request for handing over a UE from a legacy wireless access network (legacy AN) utilizing a legacy RAT to a next generation wireless access network (next generation AN) utilizing a next generation RAT. The handover request may include an identifier of a target cell within the next generation AN. For example, the CP-MM and/or CP-SM may receive the handover request from an eMME within the next generation core network.

At block 2704, the next generation core network serving node may select a next generation AN based on the target cell ID. At block 2706, the next generation core network serving node may then communicate with the next generation AN to establish connectivity and context for the handover.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-27 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-12 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method for performing a handover between core networks in a communication network, comprising:
   receiving, at a first core network serving node within a first core network supporting a first radio access technology (RAT), a handover request for performing a handover of a user equipment from a first wireless access network utilizing the first RAT to a second wireless access network utilizing a second RAT, the handover request including an identifier of a target cell within the second wireless access network;

identifying a second core network serving node within a second core network supporting the second RAT based on the identifier of the target cell, wherein the first RAT provides connectivity to one or more data networks via the first core network based on at least one or more Data Network Session (DNS) connections, each including one or more data flows, wherein the second RAT provides connectivity to the one or more data networks via the second core network based on one or more Packet Data Network (PDN) connections;

identifying the data flows within one or more active DNS connections of the user equipment to be handed over from the first wireless access network to the second wireless access network;

for each of the data flows, mapping the data flow to a corresponding PDN connection and a corresponding Generic Tunneling Protocol (GTP) tunnel within the corresponding PDN connection for communicating over the second wireless access network; and forwarding the handover request to the second core network serving node to complete the handover.

2. The method of claim 1, further comprising:
converting resource information utilized in the first core network to access information utilized in the second core network; and
forwarding the access information to the second core network serving node.

3. The method of claim 2, wherein the resource information comprises at least one of radio bearer configuration information or security information.

4. The method of claim 1, further comprising:
determining whether Quality of Service (QoS) parameters for the second RAT are available; and
if the QoS parameters for the second RAT are available, forwarding the QoS parameters for the second RAT to the second core network serving node.

5. The method of claim 1, wherein mapping the data flow to the corresponding PDN connection and the corresponding GTP tunnel within the corresponding PDN connection further comprises:
mapping the data flow to the corresponding PDN connection and the corresponding GTP tunnel within the corresponding PDN connection based on a data network of the one or more data networks to which the data flow provides connectivity.

6. The method of claim 5, wherein mapping the data flow to the corresponding PDN connection and the corresponding GTP tunnel within the corresponding PDN connection further comprises:
mapping the data flow to the corresponding PDN connection and the corresponding GTP tunnel within the corresponding PDN connection further based on one or more characteristics of the data flow.

7. The method of claim 1, further comprising:
providing mapping information indicating the mapping between the data flows and the corresponding PDN connections and the corresponding GTP tunnels within the corresponding PDN connections to an interworking serving gateway within the first core network; and
providing the mapping information to the user equipment.

8. The method of claim 1, wherein:
each of the data flows is associated with a different Internet Protocol (IP) address of the user equipment utilized in the first core network; and
each of the corresponding PDN connections is associated with an additional different IP address of the user equipment utilized in the second wireless access network.

9. The method of claim 8, wherein a first PDN connection comprises two or more of the data flows, each mapped to a different corresponding GTP tunnel within the first PDN connection.

10. The method of claim 1, further comprising:
mapping a set of two or more data flows mapped to a first PDN connection to two or more additional GTP tunnels within the first core network, wherein each of the two or more additional GTP tunnels provides connectivity to a different user plane gateway in the first core network.

11. The method of claim 1, wherein each of the data flows comprises an IP flow, an Ethernet flow, or an unstructured data flow.

12. A first core network serving node within a first core network, comprising:
an interface communicatively coupled to a first wireless access network via the first core network, the first wireless access network utilizing a first radio access technology (RAT);
a memory; and
a processor communicatively coupled to the interface and the memory, the processor configured to:
receive a handover request for performing a handover of a user equipment from the first wireless access network to a second wireless access network utilizing a second RAT, the handover request including an identifier of a target cell within the second wireless access network;
identify a second core network serving node within a second core network supporting the second RAT based on the identifier of the target cell, wherein the first RAT provides connectivity to one or more data networks via the first core network based on at least one or more Data Network Session (DNS) connections, each including one or more data flows, wherein the second RAT provides connectivity to the one or more data networks via the second core network based on one or more Packet Data Network (PDN) connections;
identify the data flows within one or more active DNS connections of the user equipment to be handed over from the first wireless access network to the second wireless access network;
for each of the data flows, map the data flow to a corresponding PDN connection and a corresponding Generic Tunneling Protocol (GTP) tunnel within the corresponding PDN connection for communicating over the second wireless access network; and
forward the handover request to the second core network serving node to complete the handover.

13. The first core network serving node of claim 12, wherein the processor is further configured to:
convert resource information utilized in the first core network to access information utilized in the second core network; and
forward the access information to the second core network serving node.

14. The first core network serving node of claim 13, wherein the resource information comprises at least one of radio bearer configuration information or security information.

15. The first core network serving node of claim 12, wherein the processor is further configured to:
  determine whether Quality of Service (QoS) parameters for the second RAT are available; and
  if the QoS parameters for the second RAT are available, forward the QoS parameters for the second RAT to the second core network serving node.

16. The first core network serving node of claim 12, wherein the processor is further configured to:
  map the data flow to the corresponding PDN connection and the corresponding GTP tunnel within the corresponding PDN connection based on a data network of the one or more data networks to which the data flow provides connectivity.

17. The first core network serving node of claim 16, wherein the processor is further configured to:
  map the data flow to the corresponding PDN connection and the corresponding GTP tunnel within the corresponding PDN connection further based on one or more characteristics of the data flow.

18. The first core network serving node of claim 12, wherein the processor is further configured to:
  provide mapping information indicating the mapping between the data flows and the corresponding PDN connections and the corresponding GTP tunnels within the corresponding PDN connections to an interworking serving gateway within the first core network; and
  provide the mapping information to the user equipment.

19. The first core network serving node of claim 12, wherein:
  each of the data flows is associated with a different Internet Protocol (IP) address of the user equipment utilized in the first core network; and
  each of the corresponding PDN connections is associated with an additional different IP address of the user equipment utilized in the second wireless access network.

20. The first core network serving node of claim 19, wherein a first PDN connection comprises two or more of the data flows, each mapped to a different corresponding GTP tunnel within the first PDN connection.

21. The first core network serving node of claim 12, wherein the processor is further configured to:
  map a set of two or more data flows mapped to a first PDN connection to two or more additional GTP tunnels within the first core network, wherein each of the two or more additional GTP tunnels provides connectivity to a different user plane gateway in the first core network.

22. The first core network serving node of claim 12, wherein each of the data flows comprises an IP flow, an Ethernet flow, or an unstructured data flow.

23. A first core network serving node apparatus within a first core network supporting a first radio access technology (RAT), comprising:
  means for receiving a handover request for performing a handover of a user equipment from a first wireless access network utilizing the first RAT to a second wireless access network utilizing a second RAT, the handover request including an identifier of a target cell within the second wireless access network;
  means for identifying a second core network serving node apparatus within a second core network supporting the second RAT based on the identifier of the target cell, wherein the first RAT provides connectivity to one or more data networks via the first core network based on at least one or more Data Network Session (DNS) connections, each including one or more data flows, wherein the second RAT provides connectivity to the one or more data networks via the second core network based on one or more Packet Data Network (PDN) connections;
  means for identifying the data flows within one or more active DNS connections of the user equipment to be handed over from the first wireless access network to the second wireless access network;
  for each of the data flows, means for mapping the data flow to a corresponding PDN connection and a corresponding Generic Tunneling Protocol (GTP) tunnel within the corresponding PDN connection for communicating over the second wireless access network; and
  means for forwarding the handover request to the second core network serving node apparatus to complete the handover.

24. The first core network serving node apparatus of claim 23, further comprising:
  means for converting resource information utilized in the first core network to access information utilized in the second core network; and
  means for forwarding the access information to the second core network serving node apparatus.

25. The first core network serving node apparatus of claim 24, wherein the resource information comprises at least one of radio bearer configuration information or security information.

26. The first core network serving node apparatus of claim 23, further comprising:
  means for determining whether Quality of Service (QoS) parameters for the second RAT are available; and
  if the QoS parameters for the second RAT are available, means for forwarding the QoS parameters for the second RAT to the second core network serving node apparatus.

27. The first core network serving node apparatus of claim 23, wherein the means for mapping the data flow to the corresponding PDN connection and the corresponding GTP tunnel within the corresponding PDN connection further comprises:
  means for mapping the data flow to the corresponding PDN connection and the corresponding GTP tunnel within the corresponding PDN connection based on a data network of the one or more data networks to which the data flow provides connectivity.

28. The first core network serving node apparatus of claim 27, wherein the means for mapping the data flow to the corresponding PDN connection and the corresponding GTP tunnel within the corresponding PDN connection further comprises:
  means for mapping the data flow to the corresponding PDN connection and the corresponding GTP tunnel within the corresponding PDN connection further based on one or more characteristics of the data flow.

29. The first core network serving node apparatus of claim 23, further comprising:
  means for providing mapping information indicating the mapping between the data flows and the corresponding PDN connections and the corresponding GTP tunnels within the corresponding PDN connections to an interworking serving gateway within the first core network; and
  means for providing the mapping information to the user equipment.

30. The first core network serving node apparatus of claim 23, wherein:

each of the data flows is associated with a different Internet Protocol (IP) address of the user equipment utilized in the first core network; and each of the corresponding PDN connections is associated with an additional different IP address of the user equipment utilized in the second wireless access network.

31. The first core network serving node apparatus of claim 30, wherein a first PDN connection comprises two or more of the data flows, each mapped to a different corresponding GTP tunnel within the first PDN connection.

32. The first core network serving node apparatus of claim 23, further comprising:

means for mapping a set of two or more data flows mapped to a first PDN connection to two or more additional GTP tunnels within the first core network, wherein each of the two or more additional GTP tunnels provides connectivity to a different user plane gateway in the first core network.

33. The first core network serving node apparatus of claim 23, wherein each of the data flows comprises an IP flow, an Ethernet flow, or an unstructured data flow.

* * * * *